United States Patent
Ochiai et al.

(10) Patent No.: US 9,677,799 B2
(45) Date of Patent: Jun. 13, 2017

(54) REFRIGERATION AND AIR-CONDITIONING APPARATUS, REFRIGERANT LEAKAGE DETECTION DEVICE, AND REFRIGERANT LEAKAGE DETECTION METHOD

(71) Applicant: Mitsubishi Electric Corporation, Tokyo (JP)

(72) Inventors: Yasutaka Ochiai, Tokyo (JP); Makoto Saito, Tokyo (JP); Fumitake Unezaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 14/416,087

(22) PCT Filed: May 28, 2013

(86) PCT No.: PCT/JP2013/064688
§ 371 (c)(1),
(2) Date: Jan. 21, 2015

(87) PCT Pub. No.: WO2014/017161
PCT Pub. Date: Jan. 30, 2014

(65) Prior Publication Data
US 2015/0176880 A1    Jun. 25, 2015

(30) Foreign Application Priority Data
Jul. 23, 2012    (JP) .................... 2012-162325

(51) Int. Cl.
| | |
|---|---|
| *F25B 1/00* | (2006.01) |
| *F25B 49/02* | (2006.01) |
| *F25B 49/00* | (2006.01) |
| *F25B 13/00* | (2006.01) |
| *F25B 41/04* | (2006.01) |
| *F25B 43/00* | (2006.01) |

(52) U.S. Cl.
CPC ............ *F25B 49/022* (2013.01); *F25B 13/00* (2013.01); *F25B 49/005* (2013.01); *F25B 49/02* (2013.01);
(Continued)

(58) Field of Classification Search
CPC ....... F25B 41/062; F25B 49/022; F25B 45/00
(Continued)

(56) References Cited

U.S. PATENT DOCUMENTS 4,487,031 A * 12/1984 Rogers ...................... F25B 5/00
                                                           62/160
4,771,610 A    9/1988 Nakashima et al.
(Continued)

FOREIGN PATENT DOCUMENTS

| EP | 1 970 651 A1 | 9/2008 |
|---|---|---|
| FR | 2949559 A1 | 3/2011 |

(Continued)

OTHER PUBLICATIONS

Office Action mailed Nov. 17, 2015 issued in corresponding JP patent application No. 2014-526797 (and English translation).
(Continued)

*Primary Examiner* — Melvin Jones
(74) *Attorney, Agent, or Firm* — Posz Law Group, PLC

(57) ABSTRACT

A refrigeration and air-conditioning apparatus rapidly varies the pressure or the temperature inside a liquid reserve container to identify a liquid level position inside the liquid reserve container on the basis of the surface temperature of the liquid reserve container.

22 Claims, 7 Drawing Sheets

(52) U.S. Cl.
CPC .......... *F25B 41/043* (2013.01); *F25B 43/006* (2013.01); *F25B 2313/0294* (2013.01); *F25B 2313/0314* (2013.01); *F25B 2313/0315* (2013.01); *F25B 2500/19* (2013.01); *F25B 2500/222* (2013.01); *F25B 2600/02* (2013.01); *F25B 2600/021* (2013.01); *F25B 2600/05* (2013.01); *F25B 2600/23* (2013.01); *F25B 2600/2513* (2013.01); *F25B 2600/2519* (2013.01); *F25B 2700/04* (2013.01); *F25B 2700/1931* (2013.01); *F25B 2700/1933* (2013.01); *F25B 2700/2104* (2013.01); *F25B 2700/2106* (2013.01); *F25B 2700/2108* (2013.01); *F25B 2700/2109* (2013.01); *F25B 2700/2113* (2013.01); *Y02B 30/741* (2013.01)

(58) Field of Classification Search
USPC ..................... 62/115, 125, 126, 129, 228.1
See application file for complete search history.

(56) References Cited

U.S. PATENT DOCUMENTS

| | | | |
|---|---|---|---|
| 5,655,379 A | 8/1997 | Jaster et al. | |
| 2012/0048881 A1* | 3/2012 | Drube ...................... | F17C 7/02 62/50.1 |

FOREIGN PATENT DOCUMENTS

| | | | |
|---|---|---|---|
| JP | 63-116064 | A | 5/1988 |
| JP | 3273131 | B2 | 1/2002 |
| JP | 2006-250480 | A | 9/2006 |
| JP | 2008-039726 | A | 2/2008 |
| JP | 4123764 | B2 | 5/2008 |
| JP | 2009-210149 | A | 9/2009 |
| JP | 2010-236714 | A | 10/2010 |
| JP | 2011-237095 | A | 11/2011 |
| JP | 2012-117735 | A | 6/2012 |

OTHER PUBLICATIONS

Office Action issued Jan. 7, 2016 in the corresponding CN application No. 201380039162.X (with English translation).
Office Action mailed Jun. 28, 2016 issued in corresponding JP patent application No. 2014-526797 (and English translation).
International Search Report of the International Searching Authority mailed Jul. 23, 2013 for the corresponding international application No. PCT/JP2013/064688 (and English translation).
Extended European Search Report dated Nov. 2, 2016 issued in corresponding EP patent application No. 13822752.5.

* cited by examiner

F I G. 1 0
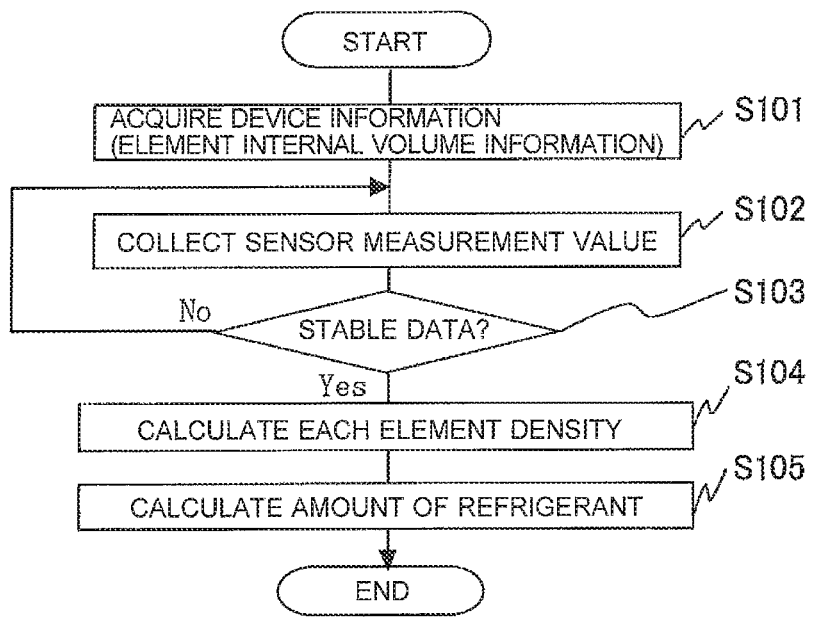

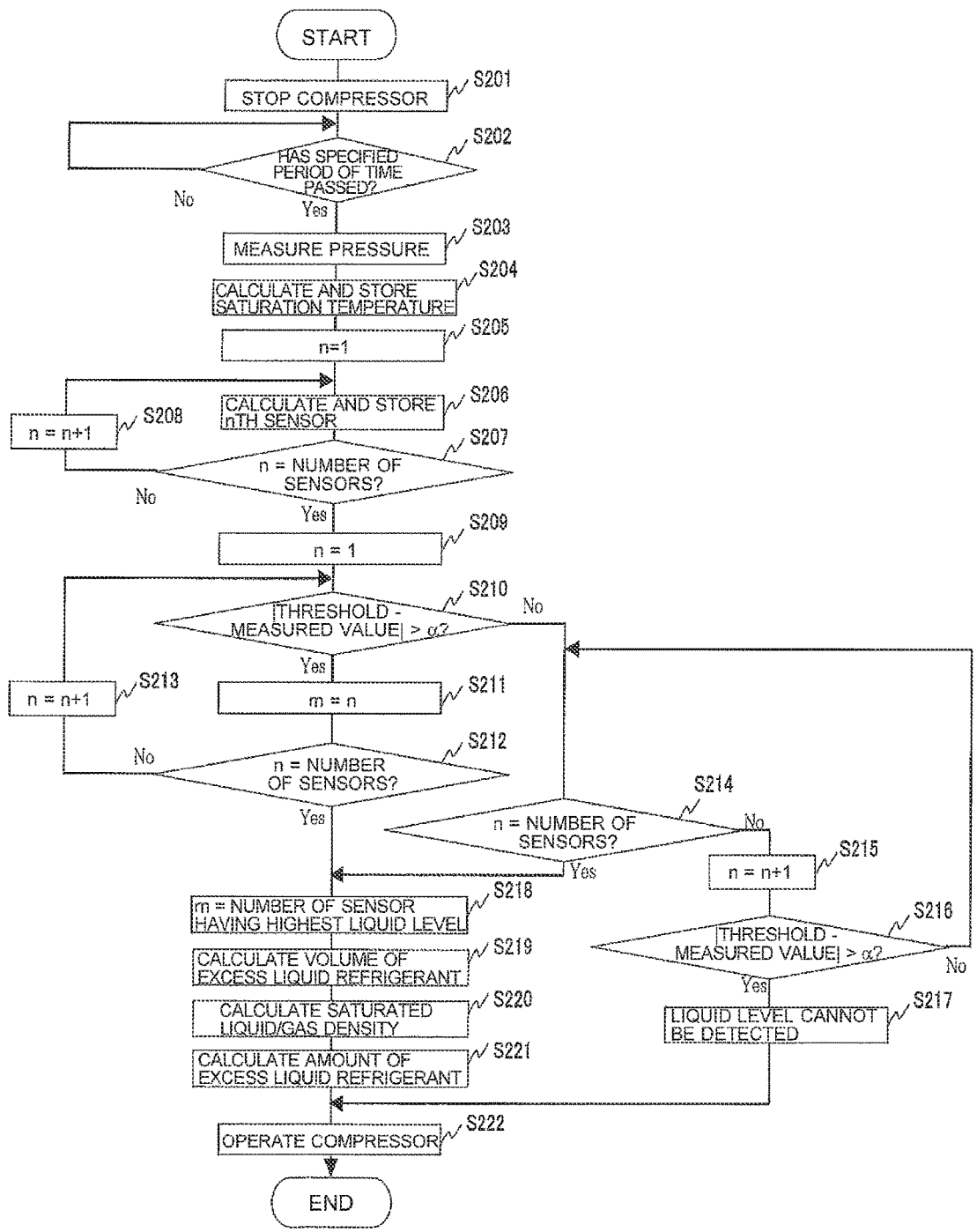

REFRIGERATION AND AIR-CONDITIONING APPARATUS, REFRIGERANT LEAKAGE DETECTION DEVICE, AND REFRIGERANT LEAKAGE DETECTION METHOD

CROSS REFERENCE TO RELATED APPLICATION

This application is a U.S. national stage application of International Application No. PCT/JP2013/064688 filed on May 28, 2013 and is based on Japanese Patent Application No. 2012-162325 filed on Jul. 23, 2012, the disclosures of which are incorporated by reference.

TECHNICAL FIELD

The present invention relates to a refrigeration and air-conditioning apparatus, a refrigerant leakage detection device, and a refrigerant leakage detection method capable of detecting refrigerant leakage from a refrigerant circuit.

BACKGROUND ART

A refrigeration and air-conditioning apparatus has been known which detects leakage of a refrigerant from a refrigerant circuit of the refrigeration and air-conditioning apparatus by calculating the refrigerant density of individual elements (driving devices (actuators) such as a compressor and an expansion valve) forming a refrigeration cycle on the basis of detection results of a pressure sensor and a temperature sensor used for controlling the elements and calculating the amount of refrigerant within the refrigerant circuit by adding up the internal volumes of the elements (see, for example, Patent Literature 1).

The amount of refrigerant necessary for operation differs according to the operation conditions of the refrigeration and air-conditioning apparatus. Therefore, a liquid reserve container for reserving excess refrigerant may be installed. Such a liquid reserve container is installed on a high-pressure side or low-pressure side of the refrigerant circuit. In order to detect refrigerant leakage from the refrigerant circuit, it is necessary to calculate the amount of refrigerant in the individual elements forming the refrigeration and air-conditioning apparatus.

The state of a refrigerant in the element devices other than the liquid reserve container can be estimated from existing sensor measurement values, such as pressure and temperature, used for an operation of the refrigeration and air-conditioning apparatus. Thus, the amount of refrigerant in such element devices can be calculated. In contrast, the state of a refrigerant in the liquid reserve container does not change irrespective of the amount of refrigerant, and therefore the amount of refrigerant in the liquid reserve container cannot be calculated from existing sensor measurement values. Accordingly, for the liquid reserve container, after a change occurs in the internal state of the liquid reserve container, for example, after a liquid refrigerant in the liquid reserve container has become empty, abnormality, that is, a shortage of refrigerant and refrigerant leakage, are detected.

However, in the case where a state in which the amount of liquid refrigerant existing inside the liquid reserve container is more than half the total filled amount often occurs and the method described in Patent Literature 1 for detecting refrigerant leakage after excess liquid refrigerant has become empty is used, a large amount of refrigerant leaks into the air.

Under such circumstances, as measures to identify the excess liquid amount so that refrigerant leakage can be detected as early as possible, the liquid reserve container is provided with a window or a float-type sensor for measuring the liquid level is installed inside the liquid reserve container.

However, in order to identify the excess liquid amount in an existing apparatus by using the above measures, such as providing the liquid reserve container with a window or installing a sensor in the liquid reserve container, processing for installing the window or the sensor at the existing apparatus is required. In actuality, it is very difficult to perform such processing. Even if such processing is possible, modifying the liquid reserve container, in which the pressure inside the device is greatly variable, reduces the withstand pressure and thus greatly affects the reliability. Furthermore, an operation for making a hole or a window is complicated and takes time and effort, and a problem such as increasing the cost occurs.

A technology for detecting refrigerant leakage is suggested in which a liquid level detection sensor using ultrasonic waves is disposed outside the liquid reserve container so that the liquid level height inside the liquid reserve container can be detected by the liquid level detection sensor, while the refrigerant density is obtained on the basis of the temperature of the refrigerant to convert the liquid level height into the amount of excess liquid refrigerant using the liquid density or the like (see, for example, Patent Literature 2). With this technology, even if excess liquid refrigerant is reserved inside the liquid reserve container, the amount of the excess liquid amount can be detected. Therefore, the total amount of refrigerant inside the refrigeration and air-conditioning apparatus can be calculated. Thus, it is possible to detect refrigerant leakage early.

In addition, a method for identifying the amount of excess liquid refrigerant inside the liquid reserve container by identifying the liquid level position of the amount of excess liquid refrigerant has been known. A method for identifying the liquid level inside the liquid reserve container has been known in which a plurality of sensors each including a heater, a temperature sensor, and a protection layer are used and the heaters are heated up so that the liquid level inside the liquid reserve container can be identified on the basis of a difference in the temperature between a liquid refrigerant and a gas refrigerant existing inside the liquid reservoir (see, for example, Patent Literature 3).

Furthermore, a technology has been known in which a temperature sensor is installed outside the liquid reserve container so that the liquid level inside the liquid reserve container can be identified in the case where there is a difference in the temperature between a concentrated solution and a vapor inside the liquid reserve container (see, for example, Patent Literature 4).

CITATION LIST

Patent Literature

Patent Literature 1: Japanese Unexamined Patent Application Publication No. 2010-236714 (Paragraph 26, FIG. 8, etc.)
Patent Literature 2: Japanese Patent No. 4123764 (Page 7, FIG. 4, etc.)
Patent Literature 3: Japanese Unexamined Patent Application Publication No. 2008-39726 (Page 3, FIG. 8, etc.)

Patent Literature 4: Japanese Patent No. 3273131 (Page 4, FIG. 1, etc.)

SUMMARY OF INVENTION

Technical Problem

However, in the liquid level detection method described in Patent Literature 2, in order to measure the distance to the liquid level accurately from the outside of the liquid reserve container using ultrasonic waves, it is necessary to receive reception signals correctly, and a special ultrasonic sensor which is able to receive signals in a mega Hz range is required. Furthermore, a processing circuit for reception signals is complicated, and therefore there is a problem in that the liquid level detection device is expensive.

Moreover, in order to measure the liquid level accurately using an ultrasonic sensor, there is a need to install a transmitter and a receiver at positions at which an accurate detection can be obtained, that is, positions at which the path through which a transmitted signal is reflected by the liquid level and then reflected by the receiver is shortest. More specifically, for example, a transmitter and a receiver need to be installed in an upper or lower portion of the liquid reserve container so that the liquid level and a transmission signal are vertical to each other. This depends on the measurement method of an ultrasonic liquid level meter. Ultrasonic liquid level meters calculate the liquid level height on the basis of a time difference between a transmission signal and a reception signal and the propagation speed of sound. Therefore, in order to obtain accurate measurement results, a reception signal needs to be incident vertical to the liquid level and to be reflected vertically.

In addition, in the case where the ultrasonic sensor is installed in an upper portion of the liquid reserve container, since an attenuation is likely to occur through a gas phase before ultrasonic waves reach the liquid level, the receiver is required to have an excellent sensitivity. Accordingly, when taking into consideration the influence of noise and the cost, it is preferable to install the ultrasonic sensor in a lower portion of the liquid reserve container. However, even in the case where the ultrasonic sensor is installed in the lower portion of the liquid reserve container, there are installation constraints, such as not being able to install a liquid level detection sensor because of a short distance between the ground and the liquid reserve container.

In the liquid level detection method described in Patent Literature 3, a plurality of sensors each including a heater, a temperature sensor, and a protection layer are used and the heaters are heated up so that the liquid level inside the container can be identified. However, due to measured value variations among the plurality of sensors, the liquid level position cannot be identified correctly. Such measured value variations arise from a configuration in which the sensors each include a plurality of elements: a heater, a temperature sensor, and a protection layer. For example, such measured value variations occur due to differences in multiple items among the sensors, such as the heating quantity by the heater, an error in the temperature sensor, close contact between the heater and the temperature sensor, close contact between the heater and the container, close contact between the temperature sensor and the container, and heat transfer to the outside.

In the case where there is a difference in the temperature between a concentrated solution and a vapor inside the container, by installing a temperature sensor at the container, the liquid level can be detected. However, if an azeotropic refrigerant or a near-azeotropic refrigerant is filled in the refrigerant circuit, the liquid level cannot be identified only by installing a temperature sensor at the container because there is no difference in the temperature between a gas portion and a liquid portion.

Furthermore, even in the case where a zeotropic refrigerant is filed in the refrigerant circuit, when the saturated gas temperature and the saturated liquid temperature are close to each other, there is a small difference in the temperature between gas and liquid. Therefore, when sensor errors and measured value variations among a plurality of sensors are taken into consideration, false detection results may be obtained.

The present invention has been made in view of the above issues. An object of the present invention is to provide a refrigeration and air-conditioning apparatus, a refrigerant leakage detection device, and a refrigerant leakage detection method capable of calculating the amount of liquid refrigerant inside a liquid reserve container while reducing measured value variations to as small as possible and without requiring high cost.

Solution to Problem

A refrigeration and air-conditioning apparatus according to the present invention including a refrigerant circuit formed by connecting a compressor, a condenser, an expansion valve, an evaporator, and a liquid reserve container to one another by pipes, includes a temperature sensor that measures a surface temperature of the liquid reserve container; and a controller that varies a pressure or a temperature inside the liquid reserve container. The controller identifies a liquid level position inside the liquid reserve container, based on a measured value of the temperature sensor.

A refrigerant leakage detection device according to the present invention for identifying a liquid level position inside a liquid reserve container provided as one of element devices of a refrigerant circuit to detect refrigerant leakage, includes a temperature sensor that measures a surface temperature of the liquid reserve container; and a controller that varies a pressure or a temperature inside the liquid reserve container. The controller identifies the liquid level position inside the liquid reserve container, based on a measured value of the temperature sensor, and detects refrigerant leakage by calculating a total amount of refrigerant filled in the refrigerant circuit, based on an amount of refrigerant in the refrigerant circuit other than a refrigerant reserved in the liquid reserve container and an amount of refrigerant reserved in the liquid reserve container, and comparing the total amount of refrigerant with an initial amount of refrigerant.

A refrigerant leakage detection method according to the present invention for identifying a liquid level position inside a liquid reserve container provided as one of element devices of a refrigerant circuit, based on a surface temperature of the liquid reserve container, to detect refrigerant leakage, includes varying a pressure or a temperature inside the liquid reserve container; identifying the liquid level position inside the liquid reserve container, based on the surface temperature of the liquid reserve container; calculating an amount of refrigerant in the refrigerant circuit other than a refrigerant reserved in the liquid reserve container; calculating the amount of refrigerant reserved in the liquid reserve container; and determining whether a refrigerant leaks from the refrigerant circuit by calculating a total amount of refrigerant filled in the refrigerant circuit, based on the calculated amounts of refrigerant, and comparing the total amount of refrigerant with an initial amount of refrigerant.

Advantageous Effects of Invention

With a refrigeration and air-conditioning apparatus according to the present invention, the liquid level position is identified by varying the internal pressure and temperature of a liquid reserve container to generate on the surface of the liquid reserve container a situation in which there is a difference in the temperature between a gas phase portion and a liquid phase portion and measuring the temperatures. Therefore, effects, such as a low cost, a reduction in measured value variations, and easy sensor installation, can be achieved.

Furthermore, with a refrigerant leakage detection device according to the present invention, the amount of excess liquid refrigerant in a liquid reserve container can be calculated accurately, and refrigerant leakage can therefore be detected early.

Furthermore, with a refrigerant leakage detection method according to the present invention, the amount of excess liquid refrigerant in a liquid reserve container can be calculated accurately, and refrigerant leakage can therefore be detected early.

BRIEF DESCRIPTION OF DRAWINGS

FIG. 10 is a flowchart illustrating the flow of calculation of the amount of refrigerant other than excess liquid refrigerant in step S001 of FIG. 9 which illustrates the refrigerant leakage detection process performed by the refrigeration and air-conditioning apparatus according to Embodiment of the present invention.

FIG. 11 is a flowchart illustrating the flow of calculation of the amount of excess liquid refrigerant in step S002 of FIG. 9 which illustrates the refrigerant leakage detection process performed by the refrigeration and air-conditioning apparatus according to Embodiment of the present invention.

DESCRIPTION OF EMBODIMENT

Figure 1:
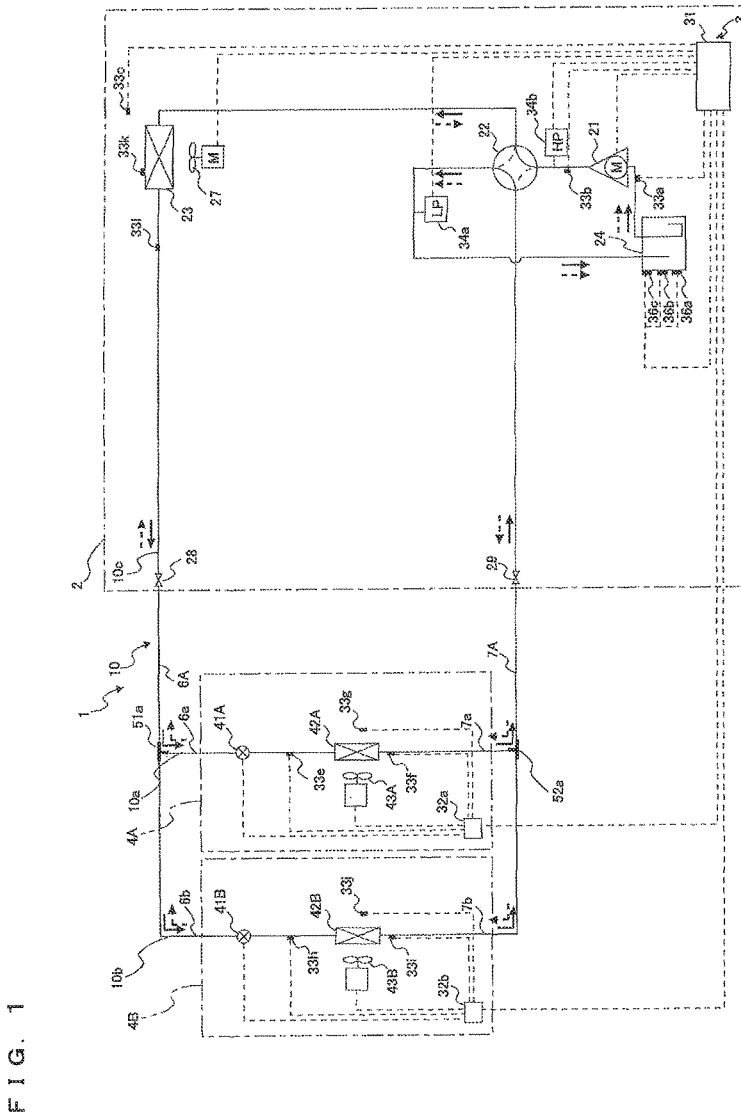
FIG. 1 is a schematic configuration diagram illustrating an example of a refrigerant circuit configuration of a refrigeration and air-conditioning apparatus according to Embodiment of the present invention.

Hereinafter, Embodiment of the present invention will be described with reference to the drawings. In the drawings provided below including FIG. 1, the size relationship of individual component parts may differ from the actual size relationship. In the drawings provided below including FIG. 1, parts referred to with the same signs correspond to the same parts or parts equivalent to the parts. The same applies throughout the description. Furthermore, forms of component elements illustrated in the description are merely exemplifications and the present invention is not limited to the described forms.

FIG. 1 is a schematic configuration diagram illustrating an example of a refrigerant circuit configuration of a refrigeration and air-conditioning apparatus 1 according to Embodiment of the present invention. The refrigerant circuit configuration and operation of the refrigeration and air-conditioning apparatus 1 will be explained with reference to FIG. 1. The refrigeration and air-conditioning apparatus 1 is installed, for example, in a building, an apartment, or the like and is used for cooling and heating of an air-conditioned area, such as a room, by performing a vapor-compression refrigeration cycle operation.

<Configuration of Refrigeration and Air-Conditioning Apparatus 1>

The refrigeration and air-conditioning apparatus 1 mainly includes an outdoor unit 2 as a heat source unit, indoor units 4 (indoor units 4A and 4B) as a plurality of use units (in FIG. 1, two units are illustrated) connected in parallel to the outdoor unit 2, and refrigerant extension pipes (a liquid-side extension pipe 6 and a gas-side extension pipe 7) connecting the outdoor unit 2 to the indoor units 4. That is, the refrigeration and air-conditioning apparatus 1 includes a refrigerant circuit 10, which is formed by connecting the outdoor unit 2 to the indoor units 4 by the refrigerant extension pipes.

The liquid-side extension pipe 6 is a pipe through which a liquid refrigerant passes, and connects the outdoor unit 2 to the indoor units 4A and 4B. The liquid-side extension pipe 6 is formed by connecting a liquid main pipe 6A, a liquid branch pipe 6a, a liquid branch pipe 6b, and a distributor 51a to one another. The gas-side extension pipe 7 is a pipe through which a gas refrigerant passes, and connects the outdoor unit 2 to the indoor units 4A and 4B. The gas-side extension pipe 7 is formed by connecting a gas main pipe 7A, a gas branch pipe 7a, a gas branch pipe 7b, and a distributor 52a to one another.

[Refrigerant]

As a refrigerant filled in the refrigerant circuit 10, an azeotropic refrigerant whose saturated gas temperature and saturated liquid temperature are equal to each other or a near-azeotropic refrigerant whose saturated gas temperature and saturated liquid temperature are substantially equal to each other, is used.

Alternatively, as a refrigerant filled in the refrigerant circuit 10, a zeotropic refrigerant may be used.

[Indoor Units 4]

The indoor units 4A and 4B receive cooling energy or heating energy supplied from the outdoor unit 2 and supplies cooled air or heated air to an air-conditioned area. In the explanation provided below, "A" or "B" to be provided after the indoor units 4 may be omitted. In such a case, indoor units 4 without "A" or "B" indicate both the indoor units 4A and 4B. Furthermore, devices of the "indoor unit 4A" system (including part of a circuit) are illustrated such that "A (or a)" is provided after the corresponding signs, and devices of the "indoor unit 4B" system (including part of a circuit) are illustrated such that "B (or b)" is provided after the corresponding signs. Also in the explanation for those devices, "A (or a)" or "B (or b)" to be provided after the corresponding signs may be omitted. In such a case, obviously, devices without "A (or a)" or "B (or b)" indicate both devices of the indoor units 4A and 4B.

The indoor units 4 are installed to be embedded in or suspended from the ceiling of a room, to be hung on the wall of the room, or the like in a building or the like. The indoor unit 4A is connected to the outdoor unit 2 by the liquid main pipe 6A, the distributor 51a, the liquid branch pipe 6a, the gas branch pipe 7a, the distributor 52a, and the gas main pipe 7A, and constitutes part of the refrigerant circuit 10. The indoor unit 4B is connected to the outdoor unit 2 by the liquid main pipe 6A, the distributor 51a, the liquid branch pipe 6b, the gas branch pipe 7b, the distributor 52a, and the gas main pipe 7A, and constitutes part of the refrigerant circuit 10.

Each of the indoor units 4 mainly includes an indoor-side refrigerant circuit (an indoor-side refrigerant circuit 10a for the indoor unit 4A, and an indoor-side refrigerant circuit 10b for the indoor unit 4B). The indoor-side refrigerant circuit is formed by mainly connecting an expansion valve 41 as an expansion mechanism and an indoor heat exchanger 42 as a use-side heat exchanger in series to each other.

The expansion valve 41 is provided on the liquid side of the indoor heat exchanger 42 in order to perform adjustment of the flow rate of a refrigerant flowing inside the indoor-side refrigerant circuit, and the like, and decompresses and expands the refrigerant. The expansion valve 41 may be a valve whose opening degree can be variably controlled, such as an electronic expansion valve.

The indoor heat exchanger 42 functions as a condenser (radiator) for a refrigerant to heat indoor air during a heating operation and functions as an evaporator for a refrigerant to cool indoor air during a cooling operation. Thus, the indoor heat exchanger 42 performs heat exchange between a heat medium (for example, air, water, etc.) and a refrigerant to condense and liquefy or evaporate and gasify the refrigerant. The form of the indoor heat exchanger 42 is not particularly limited. The indoor heat exchanger 42 may be, for example, a fin-and-tube-shaped heat exchanger of a cross-fin type, which includes a heat transfer pipe and numerous fins.

The indoor units 4 each include an indoor fan 43 as an air-sending device for sucking indoor air into the unit to cause heat exchange with a refrigerant to be performed at the indoor heat exchanger 42 and then supplying the processed air as supply air into the room. The indoor fan 43 is able to vary the flow rate of air to be supplied to the indoor heat exchanger 42 and may be, for example, a centrifugal fan, a multiblade fan, or the like, which is driven by a DC fan motor. Note that the indoor heat exchanger 42 may perform heat exchange between a refrigerant and a heat medium (for example, water, brine, etc.) different from air.

Various sensors are provided in the indoor units 4. Gas-side temperature sensors (temperature sensors 33f (mounted in the indoor unit 4A) and 33i (mounted in the indoor unit 4B)) for detecting the temperature of a refrigerant (that is, a refrigerant temperature corresponding to a condensing temperature Tc for a heating operation or an evaporating temperature Te for a cooling operation) are provided on the gas-side of the indoor heat exchangers 42. Liquid-side temperature sensors (temperature sensors 33e (mounted in the indoor unit 4A) and 33h (mounted in the indoor unit 4B)) for detecting the temperature Teo of a refrigerant are provided on the liquid-side of the indoor heat exchangers 42. Indoor temperature sensors (indoor temperature sensors 33g (mounted in the indoor unit 4A) and 33j (mounted in the indoor unit 4B)) for detecting the temperature of indoor air flowing inside the units (that is, an indoor temperature Tr) are provided on the indoor air suction side of the indoor units 4.

Information (temperature information) detected by the above various sensors is transmitted to a controller (indoor-side control units 32) for controlling operations of the individual devices mounted in the indoor units 4, and is used for operation control of the devices. The type of the liquid-side temperature sensors, the gas-side temperature sensors, and the indoor temperature sensors is not particularly limited. These sensors may be, for example, thermistors or the like. That is, the temperature of a refrigerant may be measured appropriately according to the operation state by corresponding temperature sensors.

The indoor units 4 each include the indoor-side control unit 32 for controlling operations of the individual devices forming the indoor unit 4. The indoor-side control unit 32 includes a microcomputer, a memory, and the like provided for controlling the indoor unit 4. The indoor-side control unit 32 is configured to be able to transmit and receive a control signal and the like to and from a remote controller (not illustrated) for individually operating the indoor unit 4 and to transmit and receive a control signal and the like to and from the outdoor unit 2 (more particularly, an outdoor-side control unit 31) via a transmission line (or may be in a wireless manner). That is, by cooperation with the outdoor-side control unit 31, the indoor-side control units 32 function as a controller 3 (see FIG. 2) which performs operation control of the entire refrigeration and air-conditioning apparatus 1.

[Outdoor Unit 2]

The outdoor unit 2 has a function for supplying cooling energy or heating energy to the indoor units 4. The outdoor unit 2 is installed, for example, outside a building or the like, is connected to the indoor units 4 by the liquid-side extension pipe 6 and the gas-side extension pipe 7, and constitutes part of the refrigerant circuit 10. That is, a refrigerant which has flowed out of the outdoor unit 2 and flows through the liquid main pipe 6A is split at the distributor 51a. The split refrigerants flow through the liquid branch pipe 6a and the liquid branch pipe 6b into the indoor unit 4A and the indoor unit 4B, respectively. Similarly, a refrigerant which has flowed out of the outdoor unit 2 and flows through the gas main pipe 7A is split at the distributor 52a. The split refrigerants flow through the gas branch pipe 7a and the gas branch pipe 7b into the indoor unit 4A and the indoor unit 4B, respectively.

The outdoor unit 2 mainly includes an outdoor-side refrigerant circuit 10c which constitutes part of the refrigerant circuit 10. The outdoor-side refrigerant circuit 10c is formed by mainly connecting a compressor 21, a four-way valve 22 as a flow switching device, an outdoor heat exchanger 23 as a heat-source-side heat exchanger, a liquid reserve container 24, an opening and closing valve 28, and an opening and closing valve 29 in series to one another.

The compressor 21 sucks a refrigerant, and compresses the refrigerant into a high-temperature and high-pressure state. The operation capacity of the compressor 21 may be variable. The compressor 21 may be, for example, a positive-displacement compressor which is driven by a motor and whose frequency F is controlled by an inverter, or the like. Although an example in which one compressor 21 is provided is illustrated in FIG. 1, the present invention is not limited to this. Two or more compressors 21 may be connected in parallel in accordance with the number of connected indoor units 4.

The four-way valve 22 switches between the flow direction of a refrigerant for a heating operation and the flow direction of a heat-source-side refrigerant for a cooling operation. During a cooling operation, the four-way valve 22 is switched as indicated by solid lines, so that the discharge side of the compressor 21 is connected to the gas side of the outdoor heat exchanger 23 and the liquid reserve container 24 is connected to the gas main pipe 7A side. Thus, the outdoor heat exchanger 23 functions as a condenser for a refrigerant compressed by the compressor 21, and the indoor heat exchangers 42 function as evaporators. During a heating operation, the four-way valve 22 is switched as indicated by dotted lines, so that the discharge side of the compressor 21 is connected to the gas main pipe 7A and the liquid reserve container 24 is connected to the gas side of the outdoor heat exchanger 23. Thus, the indoor heat exchangers 42 function as condensers for a refrigerant compressed by the compressor 21, and the outdoor heat exchanger 23 functions as an evaporator.

The outdoor heat exchanger 23 functions as an evaporator for a refrigerant during a heating operation and functions as a condenser (radiator) for a refrigerant during a cooling operation. Thus, the outdoor heat exchanger 23 performs heat exchange between a heat medium (for example, air, water, etc.) and a refrigerant to evaporate and gasify or condense and liquefy the refrigerant. The form of the outdoor heat exchanger 23 is not particularly limited. The outdoor heat exchanger 23 may be, for example, a fin-and-tube-shaped heat exchanger of a cross-fin type, which includes a heat transfer pipe and numerous fins. The gas side of the outdoor heat exchanger 23 is connected to the four-way valve 22, and the liquid side is connected to the liquid main pipe 6A.

The outdoor unit 2 includes an outdoor fan 27 as an air-sending device for sucking outdoor air into the unit to cause heat exchange with a refrigerant to be performed at the outdoor heat exchanger 23 and then discharging the processed air to the outside of the room. The outdoor fan 27 is able to vary the flow rate of air to be supplied to the outdoor heat exchanger 23 and may be, for example, a propeller fan or the like, which is driven by a motor formed of a DC fan motor. The outdoor heat exchanger 23 may perform heat exchange between a refrigerant and a heat medium (for example, water, brine, etc.) different from air.

The liquid reserve container 24 is connected to the suction side of the compressor 21. The liquid reserve container 24 is a container in which excess refrigerant generated in the refrigerant circuit 10 can be reserved in accordance with variations of the operation load of the outdoor unit 2, the indoor units 4, and the pipes, and the like. It is necessary for the liquid reserve container 24 to be made of metal such as a carbon sheet and to be a pressure container designed and manufactured conforming to regulations and taking pressure resistance into consideration.

For detection of refrigerant leakage at the refrigerant circuit 10, it is required to detect the amount of excess liquid refrigerant reserved in the liquid reserve container 24. It is possible for the liquid reserve container 24 to be partially provided with a transparent part, such as an observation window. From a practical point of view, however, a most part of the liquid reserve container 24 is opaque, and therefore it is impossible to measure the liquid level inside the liquid reserve container 24 from outside of the liquid reserve container 24 by using light or the like or to visually confirm the entire interior of the liquid reserve container 24. Furthermore, even if a transparent observation window is installed at a portion of the liquid reserve container 24, since the liquid level inside the liquid reserve container 24 varies at all times, it is difficult to measure or monitor the accurate position of the liquid level of the refrigerant inside the liquid reserve container 24 through the observation window.

In the refrigeration and air-conditioning apparatus 1, in order to detect the liquid level, a temperature sensor is installed outside the liquid reserve container 24. However, since a refrigerant in the refrigerant circuit 10 is an azeotropic refrigerant or a near-azeotropic refrigerant and the temperature of gas and the temperature of liquid inside the liquid reserve container 24 are equal to each other, even if the temperature sensor is installed at the liquid reserve container 24, a distinction between gas and liquid cannot be made. Therefore, in the refrigeration and air-conditioning apparatus 1, a determination as to whether the refrigerant is gas or liquid is made at a position where a temperature sensor is installed, by varying the compressor 21, the outdoor fan 27, the opening and closing valve 28, the opening and closing valve 29, the expansion valves 41, the indoor fans 43, and the like, which are element devices of the refrigeration and air-conditioning apparatus 1, to generate a temperature difference between a gas-phase portion and a liquid-phase portion.

Furthermore, even in the case where a zeotropic refrigerant is filled in the refrigerant circuit 10, if the saturated gas temperature and the saturated liquid temperature are close to each other, a false detection result may be obtained because of a small temperature difference between gas and liquid. Thus, the refrigeration and air-conditioning apparatus 1 is able to generate a temperature difference between a gas-phase portion and a liquid-phase portion, and is therefore able to effectively determine whether the refrigerant is gas or liquid at a position where a temperature sensor is installed even if a zeotropic refrigerant is used.

For example, as illustrated in FIG. 1, three temperature sensors (temperature sensors 36a to 36c) with which a distinction between gas and liquid can be made may be installed in a direction vertical to the liquid reserve container 24, so that a determination as to whether a refrigerant is gas or liquid can be performed. Thus, the refrigeration and air-conditioning apparatus 1 identifies the liquid level position inside the liquid reserve container 24, and converts the identified liquid level position into the amount of reserved liquid refrigerant (the amount of excess liquid refrigerant) inside the liquid reserve container 24. That is, a plurality of temperature sensors function as a liquid level detection device installed at the liquid reserve container 24. Processing of conversion into the amount of excess liquid refrigerant will be described in detail later.

Although the simplest configuration in which only temperature sensors are installed is illustrated in FIG. 1 as a configuration of a sensor portion of a liquid level detection device installed at the liquid reserve container 24, the present invention is not limited to this. For example, a configuration in which a heat insulator is installed outside a temperature sensor in order to avoid external influences as much as possible, a configuration in which a heat conduction sheet is installed between the container and a temperature sensor in order to reliably transfer the container surface temperature to the temperature sensor, or the like is also possible. The heat insulator used here may be a foam insulator which is typically made of polystyrene foam, phenolic foam, and urethane foam, or a fiber heat insulator which is typically made of glass wool. The heat conduction sheet may be a metal sheet with excellent heat conduction, such as silicon, copper, or aluminum. The heat conduction sheet is not necessarily a uniform-heat sheet. Heat conduction grease or the like may be used to avoid generation of an air layer.

The opening and closing valve 28 and the opening and closing valve 29 are provided at connection ports between external devices and pipes (more specifically, the liquid main pipe 6A and the gas main pipe 7A), and allow or do not allow passage of a refrigerant by opening or closing.

A plurality of pressure sensors and temperature sensors are provided in the outdoor unit 2. As the pressure sensors, a suction pressure sensor 34a which detects the suction pressure Ps of the compressor 21 and a discharge pressure sensor 34b which detects the discharge pressure Pd of the compressor 21 are installed.

As the temperature sensors, a suction temperature sensor 33a which is installed at a position between the liquid reserve container 24 and the compressor 21 and which detects the suction temperature Ts of the compressor 21, a discharge temperature sensor 33b which detects the discharge temperature Td of the compressor 21, a heat exchange temperature sensor 33k which detects the temperature of a refrigerant flowing inside the outdoor heat exchanger 23, a liquid-side temperature sensor 33l which is installed on the liquid side of the outdoor heat exchanger 23 and which detects the temperature of a refrigerant on the liquid side of the outdoor heat exchanger 23, and an outdoor temperature sensor 33c which is installed on the suction side of outdoor air of the outdoor unit 2 and which detects the temperature of outdoor air flowing inside the unit are installed. Information (temperature information) detected by the above various sensors is transmitted to the controller (the outdoor-side control unit 31) for controlling operations of the individual devices mounted in the indoor unit 4, and is used for operation control for the devices. The type of the various sensors is not particularly limited. These sensors may be, for example, thermistors or the like.

The outdoor unit 2 includes the outdoor-side control unit 31 for controlling operations of the individual devices forming the outdoor unit 2. The outdoor-side control unit 31 includes an inverter circuit for controlling a microcomputer, a memory, and a motor provided for controlling the outdoor unit 2, and the like. The outdoor-side control unit 31 is able to transmit and receive a control signal and the like to and from the indoor-side control units 32 of the indoor units 4 via a transmission line (or may be in a wireless manner). That is, by cooperation with the indoor-side control units 32, the outdoor-side control unit 31 functions as the controller 3 (see FIG. 2) which performs operation control of the entire refrigeration and air-conditioning apparatus 1.

(Extension Pipes)

The extension pipes (the liquid-side extension pipe 6 and the gas-side extension pipe 7) are necessary for connecting the outdoor unit 2 to the indoor units 4 and allowing a refrigerant to circulate in the refrigerant circuit of the refrigeration and air-conditioning apparatus 1.

The extension pipes are constituted of the liquid-side extension pipe 6 (the liquid main pipe 6A and the liquid branch pipes 6a and 6b) and the gas-side extension pipe 7 (the gas main pipe 7A and the gas branch pipes 7a and 7b) and is constructed on-site at the time when the refrigeration and air-conditioning apparatus 1 is installed at an installation place, such as a building. Extension pipes having pipe diameters determined in accordance with a combination of the outdoor unit 2 and the indoor units 4 are used.

In Embodiment, as illustrated in FIG. 1, the distributor 51a, the distributor 52a, and the extension pipes are used to connect the single outdoor unit 2 to the two indoor units 4A and 4B. Regarding the liquid-side extension pipe 6, the outdoor unit 2 and the distributor 51a are connected by the liquid main pipe 6A, and the distributor 51a and the indoor units 4A and 4B are connected by the respective liquid branch pipes 6a and 6b. Regarding the gas-side extension pipe 7, the indoor units 4A and 4B and the distributor 52a are connected by the respective gas branch pipes 7a and 7b, and the distributor 52a and the outdoor unit 2 are connected by the gas main pipe 7A. Although T-shaped tubes are used as the distributors 51a and 52a in Embodiment, the present invention is not limited to this. Headers may be used as the distributors 51a and 52a. Furthermore, in the case where a plurality of indoor units 4 are connected, a plurality of T-shaped tubes may be used and distributed. Alternatively, headers may be used.

As described above, the refrigerant circuit 10 is formed by connecting the indoor-side refrigerant circuits 10a and 10b, the outdoor-side refrigerant circuit 10c, and the extension pipes (the liquid-side extension pipe 6 and the gas-side extension pipe 7) to one another. Furthermore, the refrigeration and air-conditioning apparatus 1 according to Embodiment switches between a cooling operation and a heating operation through the four-way valve 22 under the control of the controller 3, which is constituted of the indoor-side control units 32a and 32b and the outdoor-side control unit 31, and controls the individual devices of the outdoor unit 2 and the indoor units 4A and 4B in accordance with the operation load of the indoor units 4A and 4B.

(Control Block Configuration of Refrigeration and Air-Conditioning Apparatus 1)

Figure 2:
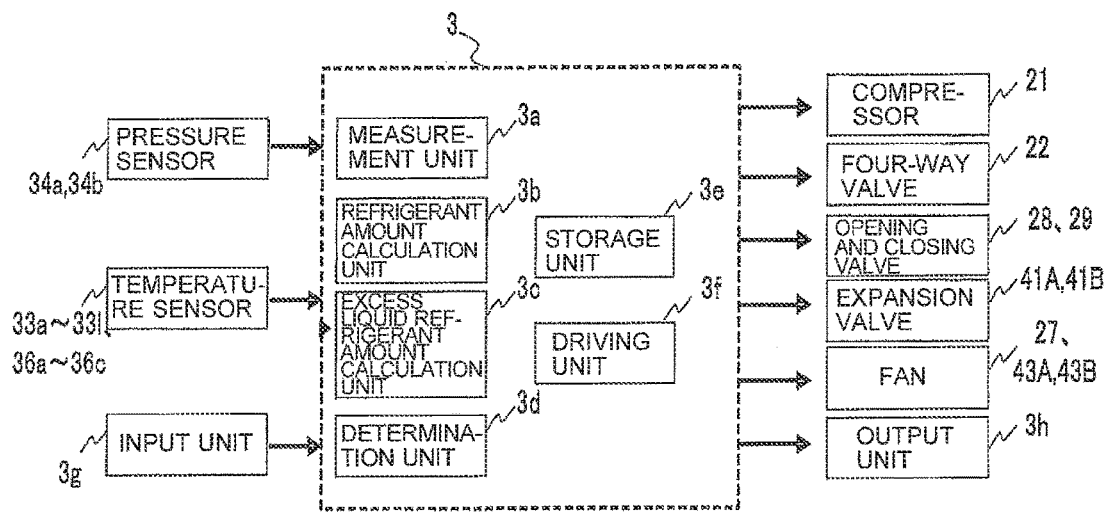
FIG. 2 is a control block diagram of the refrigeration and air-conditioning apparatus according to Embodiment of the present invention.

FIG. 2 is a control block diagram of the refrigeration and air-conditioning apparatus 1. The refrigeration and air-conditioning apparatus 1 includes a liquid level detection device which identifies the liquid level of the liquid reserve container 24 and a refrigerant leakage detection device which detects refrigerant leakage in the refrigerant circuit 10. FIG. 2 is a block diagram illustrating a state in which functional configurations of the liquid level detection device and the refrigerant leakage detection device are developed.

The controller 3 is connected so as to receive detection signals from the pressure sensors (the suction pressure sensor 34a and the discharge pressure sensor 34b) and the temperature sensors (the temperature sensors 33e and 33h, the temperature sensors 33f and 33i, the indoor temperature sensors 33g and 33j, the suction temperature sensor 33a, the discharge temperature sensor 33b, the heat exchange temperature sensor 33k, the liquid-side temperature sensor 33l, and the outdoor temperature sensor 33c). The controller 3 is also connected so as to control the individual devices (the compressor 21, the outdoor fan 27, the indoor fans 43, and the valve devices (the four-way valve 22 and the flow control valves (the opening and closing valve 28, the opening and closing valve 29, and the expansion valves 41) in accordance with the detection signals and the like. The controller 3 is also connected so as to receive detection signals from the temperature sensors 36a to 36c installed at the liquid reserve container 24.

Furthermore, the controller 3 includes a measurement unit 3a, a refrigerant amount calculation unit 3b, an excess liquid refrigerant amount calculation unit 3c, a determination unit 3d, a storage unit 3e, and a driving unit 3f. The controller 3 is also connected to an input unit 3g and an output unit 3h.

The measurement unit 3a has a function for measuring the pressure and temperature (that is, an operation state quantity) of a refrigerant circulating in the refrigerant circuit 10, on the basis of information transmitted from the pressure sensors (34a and 34b) and the temperature sensors (33a to 33l, and 36a to 36c). Furthermore, along with the pressure sensors (34a and 34b) and the temperature sensors (33a to 33l, and 36a to 36c), the measurement unit 3a forms a "measuring unit" of the present invention.

The refrigerant amount calculation unit 3b has a function for calculating the amount of refrigerant in the refrigerant circuit 10 except for the amount of excess liquid refrigerant in the liquid reserve container 24, on the basis of the information measured at the measurement unit 3a, and the like.

The excess liquid refrigerant amount calculation unit 3c has a function for identifying the liquid level position of the liquid reserve container 24 by using temperature data measured by the temperature sensors 36a to 36c, the pressure sensors, and the like and calculating the amount of excess liquid refrigerant in the liquid reserve container 24 in accordance with the identified liquid level position on the basis of a relational expression between the liquid level position stored in the storage unit 3e and the amount of liquid.

The determination unit 3d has a function for determining whether or not refrigerant leakage has occurred, on the basis of calculation results obtained from the refrigerant amount calculation unit 3b and the excess liquid refrigerant amount calculation unit 3c. The determination unit 3d is also able to calculate the amount of refrigerant leakage by obtaining a difference between the initial amount of refrigerant and the calculated amount of refrigerant in the case where it is determined that refrigerant leakage has occurred.

The storage unit 3e has a function for storing a value measured by the measurement unit 3a and values calculated by the refrigerant amount calculation unit 3b and the excess liquid refrigerant amount calculation unit 3c, storing internal volume data, which will be described later, and the initial amount of refrigerant, storing externally obtained information, and storing a relational expression, which will be described later, to be used for calculating the amount of excess liquid refrigerant.

The driving unit 3f has a function for controlling the individual elements driven in the refrigeration and air-conditioning apparatus 1 (more specifically, a compressor motor, a valve mechanism, a fan motor, etc.), on the basis of information measured by the measurement unit 3a, and the like.

The input unit 3g has a function for inputting and changing set values for various types of control. The input unit 3g may be formed by, for example, one of a remote controller, an operation panel, and an operation switch that can be operated by a user or an operator or a combination thereof.

The output unit 3h has a function for displaying a measured value measured by the measurement unit 3a, a determination result obtained by the determination unit 3d, and the like on an LED, a monitor, or the like and outputting the measured value, the determination result, and the like to the outside. The output unit 3h may function as a communication unit to communicate with an external apparatus through a telephone line, a LAN circuit, wireless communication, or the like. Accordingly, the refrigeration and air-conditioning apparatus 1 is able to transmit refrigerant leakage occurrence/non-occurrence data indicating a determination result of refrigerant leakage, and the like to a remote management center and the like through a communication line or the like. Thus, a remote monitoring function can be provided for allowing the remote management center to always detect whether or not an abnormality has occurred and for immediately performing maintenance when an abnormality has occurred.

The measurement unit 3a and the excess liquid refrigerant amount calculation unit 3c form a liquid level detection device according to the present invention. The measurement unit 3a, the refrigerant amount calculation unit 3b, the excess liquid refrigerant amount calculation unit 3c, the determination unit 3d, the storage unit 3e, and the output unit 3h form a refrigerant leakage detection device according to the present invention. In Embodiment, a configuration in which the liquid level detection device and the refrigerant leakage detection device are built in the refrigeration and air-conditioning apparatus 1 is provided. However, a single-unit configuration in which the liquid level detection device and the refrigerant leakage detection device are individually provided is also possible.

<Operation of Refrigeration and Air-Conditioning Apparatus 1>

Next, operations of the individual component elements at the time of a normal operation of the refrigeration and air-conditioning apparatus 1 will be explained.

The refrigeration and air-conditioning apparatus 1 performs a cooling and heating operation while controlling the individual component devices of the outdoor unit 2 and the indoor units 4A and 4B in accordance with the operation load of the indoor units 4A and 4B.

(Cooling Operation)

Figure 3:
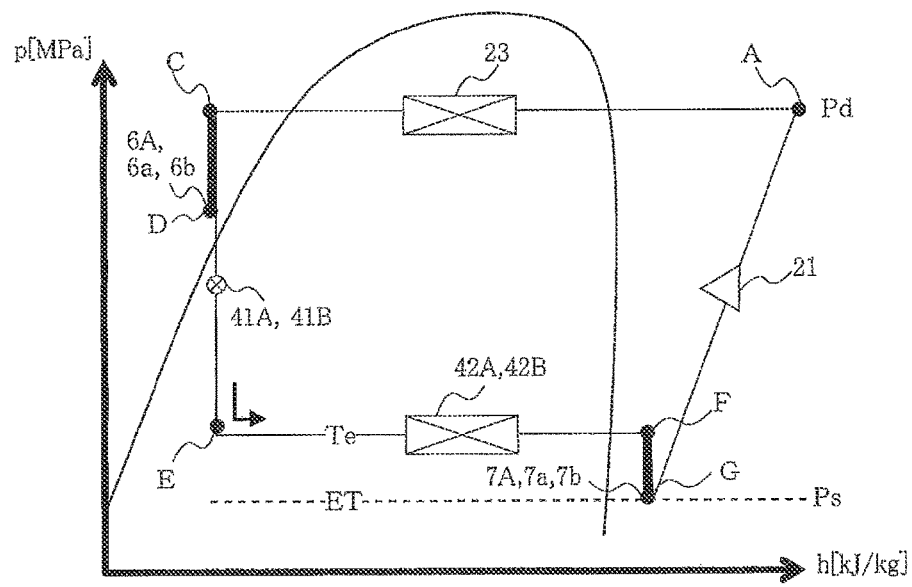
FIG. 3 is a p-h graph for a cooling operation of the refrigeration and air-conditioning apparatus according to Embodiment of the present invention.

A cooling operation performed by the refrigeration and air-conditioning apparatus 1 will be explained with reference to FIGS. 1 and 3. FIG. 3 is a p-h graph for a cooling operation of the refrigeration and air-conditioning apparatus 1. In FIG. 1, the flow of a refrigerant at the time of a cooling operation is expressed by solid-line arrows.

During a cooling operation, the four-way valve 22 is controlled to achieve the state expressed by the solid lines in FIG. 1, that is, a state in which the discharge side of the compressor 21 is connected to the gas side of the outdoor heat exchanger 23 and the suction side of the compressor 21 is connected to the gas side of the indoor heat exchangers 42A and 42B through the opening and closing valve 29 and the gas-side extension pipe 7 (the gas main pipe 7A and the gas branch pipes 7a and 7b). The opening and closing valve 28 and the opening and closing valve 29 are set to an opened state. In FIG. 1, for example, the case where both the indoor units 4A and 4B perform a cooling operation is explained.

A low-temperature and low-pressure refrigerant is compressed by the compressor 21 and is discharged as a high-temperature and high-pressure gas refrigerant (point "A" illustrated in FIG. 3). The high-temperature and high-pressure gas refrigerant which has been discharged from the compressor 21 flows through the four-way valve 22 into the outdoor heat exchanger 23. The refrigerant which has flowed into the outdoor heat exchanger 23 condenses and liquefies while transferring heat to outdoor air through an air-sending effect by the outdoor fan 27 (point "C" illustrated in FIG. 3). The condensing temperature at this time is measured by the liquid-side temperature sensor 33l or obtained by converting the pressure detected by the discharge pressure sensor 34b into a saturation temperature.

After that the high-pressure liquid refrigerant which has flowed out of the outdoor heat exchanger 23 flows out from the outdoor unit 2 through the opening and closing valve 28. The pressure of the high-pressure liquid refrigerant which has flowed out of the outdoor unit 2 is reduced by pipe wall friction at the liquid main pipe 6A, the liquid branch pipe 6a, and the liquid branch pipe 6b (point "D" illustrated in FIG. 3). This refrigerant flows into the indoor units 4A and 4B and is decompressed by the expansion valves 41A and 41B into low-pressure, two-phase gas-liquid refrigerants (point "E" illustrated in FIG. 3). The two-phase gas-liquid refrigerants flow into the indoor heat exchangers 42A and 42B functioning as evaporators for a refrigerant and evaporate and gasify while receiving heat from air through an air-sending effect by the indoor fans 43A and 43B (point "F" illustrated in FIG. 3). At this time, cooling for an air-conditioned area is performed.

The evaporating temperature at this time is measured by the temperature sensor 33e and the temperature sensor 33h. The degrees of superheat SH of refrigerants at the outlets of the indoor heat exchangers 42A and 42B are obtained by subtracting the refrigerant temperatures detected by the temperature sensor 33e and the temperature sensor 33h from the refrigerant temperature values detected by the temperature sensor 33f and the temperature sensor 33i, respectively.

The opening degrees of the expansion valves 41A and 41B are adjusted so that the degrees of superheat SH of refrigerants at the outlets of the indoor heat exchangers 42A and 42B (that is, gas side of the indoor heat exchangers 42A and 42B) are equal to a degree-of-superheat target value SHm.

The gas refrigerants which have passed through the indoor heat exchangers 42A and 42B (point "F" illustrated in FIG. 3) pass through the gas main pipe 7A, the gas branch pipe 7a, and the gas branch pipe 7b, which are the gas-side extension pipe 7, and the pressure of the gas-refrigerants are reduced by pipe wall friction at the time when passing through the gas main pipe 7A, the gas branch pipe 7a, and the gas branch pipe 7b (point "G" illustrated in FIG. 3). The refrigerant flows into the outdoor unit 2 through the opening and closing valve 29. The refrigerant which has flowed into the outdoor unit 2 passes through the four-way valve 22 and the liquid reserve container 24, and is sucked again into the compressor 21. The refrigeration and air-conditioning apparatus 1 performs a cooling operation, as described above.

(Heating Operation)

Figure 4:
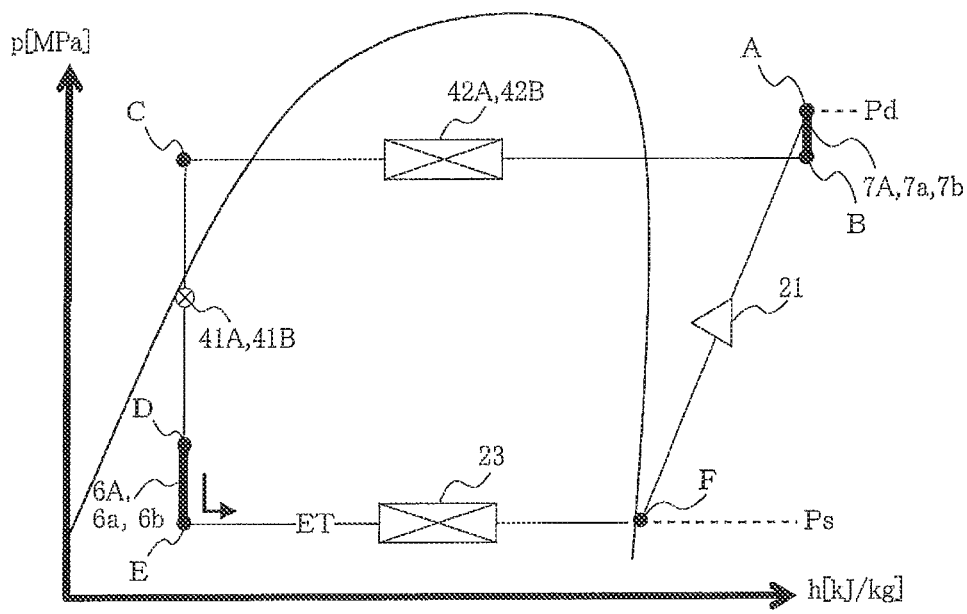
FIG. 4 is a p-h graph for a heating operation of the refrigeration and air-conditioning apparatus according to Embodiment of the present invention.

A heating operation performed by the refrigeration and air-conditioning apparatus 1 will be explained with reference to FIGS. 1 and 4. FIG. 4 is a p-h graph for a heating operation of the refrigeration and air-conditioning apparatus 1. In FIG. 1, the flow of a refrigerant at the time of a heating operation is expressed by broken-line arrows.

During a heating operation, the four-way valve 22 is controlled to achieve the state expressed by the dotted lines in FIG. 1, that is, a state in which the discharge side of the compressor 21 is connected to the gas side of the indoor heat exchangers 42A and 42B through the opening and closing valve 29 and the gas-side extension pipe 7 (the gas main pipe 7A and the gas branch pipes 7a and 7b) and the suction side of the compressor 21 is connected to the gas side of the outdoor heat exchanger 23. The opening and closing valve 28 and the opening and closing valve 29 are set to an opened state. In FIG. 1, for example, the case where both the indoor units 4A and 4B perform a heating operation is explained.

A low-temperature and low-pressure refrigerant is compressed by the compressor 21 and is discharged as a high-temperature and high-pressure gas refrigerant (point "A" illustrated in FIG. 4). The high-temperature and high-pressure gas refrigerant which has been discharged from the compressor 21 passes through the gas-side extension pipe 7 and flows out of the outdoor unit 2 through the four-way valve 22 and the opening and closing valve 29. The pressure of the high-temperature and high-pressure gas refrigerant which has been discharged from the compressor 21 is reduced by pipe wall friction at the time when passing through the gas main pipe 7A, the gas branch pipe 7a and the gas branch pipe 7b (point "B" illustrated in FIG. 4). The refrigerant flows into the indoor heat exchangers 42A and 42B of the indoor units 4A and 4B. The refrigerants which have flowed into the indoor heat exchangers 42A and 42B condense and liquefy while transferring heat to indoor air through an air-sending effect by the indoor fans 43A and 43B (point "C" illustrated in FIG. 4). At this time, heating for an air-conditioned area is performed.

The refrigerants which have flowed out of the indoor heat exchangers 42A and 42B are decompressed by the expansion valves 41A and 41B into low-pressure, two-phase gas-liquid refrigerants (point "D" illustrated in FIG. 4). The opening degrees of the expansion valves 41A and 41B are adjusted so that the degrees of subcooling SC of refrigerants at the outlets of the indoor heat exchangers 42A and 42B are equal to a degree-of-subcooling target value SCm.

SCm is set to be large when the temperature difference between the indoor set temperature and the indoor temperature is small and to be small when the temperature difference between the indoor set temperature and the indoor temperature is large. The above setting is performed so that the capacity of the indoor units 4A and 4B can be adjusted by changing the setting of SCm. When SCm is large, the expansion valves 41A and 41B operate in a closing direction in order to increase SC. Therefore, the amount of refrigerant circulation decreases, and the capacity cannot be exercised. In contrast, when SCm is small, the expansion valves 41A and 41B operate in the direction in which the opening degree increases in order to decrease SC. Therefore, the amount of refrigerant circulation increases, and the indoor heat exchangers 42A and 42B can be effectively used. Therefore, the heat exchange capacity increases.

The degrees of subcooling SC of refrigerants at the outlets of the indoor heat exchangers 42A and 42B are obtained by converting the discharge pressure Pd of the compressor 21 detected by the discharge pressure sensor 34b into a saturation temperature value corresponding to the condensing temperature Tc and subtracting the refrigerant temperature values detected by the temperature sensor 33e and the temperature sensor 33h from the saturation temperature value of the refrigerant. The degrees of subcooling SC of refrigerants at the outlets of the indoor heat exchangers 42A and 42B may be obtained by separately providing temperature sensors for detecting the temperatures of the refrigerants flowing in the indoor heat exchangers 42A and 42B and by subtracting the refrigerant temperature values detected by the temperature sensors from the refrigerant temperature values detected by the temperature sensor 33e and the temperature sensor 33h, respectively.

After that, the low-pressure, two-phase gas-liquid refrigerants pass through the liquid main pipe 6A, the liquid branch pipe 6a, and the liquid branch pipe 6b, which are the liquid-side extension pipe 6, and the pressure of the refrigerant is reduced by pipe wall friction at the time when passing through the liquid main pipe 6A, the liquid branch pipe 6*a*, and the liquid branch pipe 6*b* (point "E" illustrated in FIG. 4). Then, the refrigerant flows through the opening and closing valve 28 into the outdoor unit 2. The refrigerant which has flowed into the outdoor unit 2 flows into the outdoor heat exchanger 23, and evaporates and gasifies while receiving heat from outdoor air through an air-sending effect by the outdoor fan 27 (point "F" illustrated in FIG. 4). Then, the refrigerant passes through the four-way valve 22 and the liquid reserve container 24, and is sucked again into the compressor 21. The refrigeration and air-conditioning apparatus 1 performs a heating operation, as described above.

(Amount of Refrigerant)

Next, the amount of refrigerant in the refrigeration and air-conditioning apparatus 1 will be explained in detail.

In order for the individual element devices of the refrigerant circuit 10 of the refrigeration and air-conditioning apparatus 1 to fulfill a specific performance, an amount of refrigerant appropriate for the internal volume of the individual element devices is required. When the internal volumes or the length of the expansion pipes of the indoor units 4A and 4B change, the amount of refrigerant required for the entire refrigerant circuit 10 changes. Therefore, after the refrigerant circuit 10 is configured at a place where the refrigeration and air-conditioning apparatus 1 is installed, the refrigerant circuit 10 is filled with refrigerant of a required amount.

Furthermore, the amount of required refrigerant in the refrigerant circuit 10 varies according to the state of the refrigerant circuit 10. That is, the state of the refrigerant circuit 10 varies according to the operation state of cooling or heating and the ambient environment, such as the outside air temperature and the indoor temperature, and the amount of required refrigerant in the refrigerant circuit 10 varies accordingly. Therefore, normally, filling up of refrigerant is performed in accordance with the operation state which requires a large amount of refrigerant. Thus, in an operation state which does not require a large amount of refrigerant, excess liquid refrigerant is reserved in the liquid reserve container 24.

In Embodiment, in the refrigerant circuit 10, the amount of required refrigerant in a cooling operation is larger than that in a heating operation. This is because, since the expansion valves 41A and 41B are provided in the indoor units 4A and 4B, a liquid-phase refrigerant and a gas-phase refrigerant flow in the liquid-side extension pipe 6 and the gas-side extension pipe 7, respectively, during the cooling operation, while a two-phase refrigerant and a gas-phase refrigerant flow in the liquid-side extension pipe 6 and the gas-side extension pipe 7, respectively, during the heating operation. That is, in the liquid-side extension pipe 6, a liquid-phase state is obtained during the cooling operation and a two-phase state is obtained during the heating operation. Therefore, due to a difference between the liquid-phase state and the two-phase state, the liquid-phase state requires a larger amount of refrigerant than the two-phase state, and accordingly, the cooling operation requires a larger amount of refrigerant than the heating operation.

Furthermore, a difference in the internal volume between a condenser and an evaporator and a difference in the density between the condensing density and the evaporation density also greatly affect the amount of required refrigerant. Normally, the internal volume of the outdoor heat exchanger 23 is larger than those of the indoor heat exchangers 42A and 42B, and the average density of a condenser is larger than that of an evaporator. Therefore, since the outdoor heat exchanger 23 side having a large internal volume functions as a condenser having a large average density during a cooling operation, the cooling operation requires a larger amount of refrigerant than the heating operation.

As described above, in the case where the four-way valve 22 is switched to perform a cooling operation or a heating operation, the amount of required refrigerant differs between the cooling operation and the heating operation. In such a case, filling up of refrigerant is performed in accordance with an operation state which requires a large amount of refrigerant. In an operation state which does not require a large amount of refrigerant, excess liquid refrigerant is reserved in the liquid reserve container 24 or the like.

<Gas/Liquid Determination Principle>

Next, a principle for determining whether a refrigerant is gas or liquid will be explained by way of an example in which the compressor 21 is stopped and an example in which the opening degree of the expansion valve 41 is reduced. First, a determination as to the liquid level position inside the liquid reserve container 24 will be explained with reference to FIGS. 5 and 6. After that, a gas/liquid determination method will be explained with reference to FIGS. 7 and 8.

(Case where Compressor 21 is Stopped)

Figure 5:
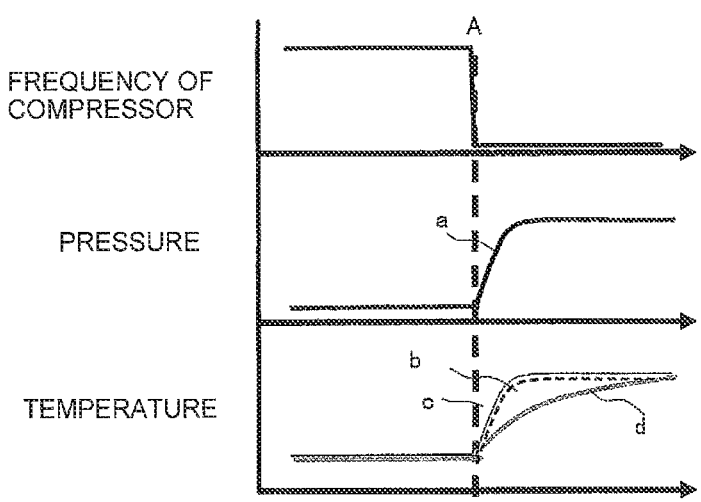
FIG. 5 illustrates time-lapse data of the frequency of a compressor and the low pressure, the saturation temperature, the gas-phase temperature, and the liquid-phase temperature inside the liquid reserve container in the case where the compressor is stopped at an specified time A.

Changes in the pressure and temperature inside the liquid reserve container 24 in the case where the compressor 21 is stopped will be explained with reference to FIG. 5, which illustrates test data. FIG. 5 illustrates time-lapse data of the frequency of the compressor 21 and the low pressure, the saturation temperature, the gas-phase temperature, and the liquid-phase temperature inside the liquid reserve container 24 in the case where the compressor 21 is stopped at an specified time A.

Since the liquid reserve container 24 is connected to the low-pressure side, the internal pressure of the liquid reserve container 24 exhibits a low value until stoppage of the compressor 21. The interior of the liquid reserve container 24 is in a state in which a liquid phase exists in a lower portion and a gas phase exits in an upper portion, that is, a two-phase state. As a refrigerant in the refrigeration and air-conditioning apparatus 1, an azeotropic refrigerant whose saturated gas temperature and saturated liquid temperature are equal to each other or a near-azeotropic refrigerant whose saturated gas temperature and saturated liquid temperature are substantially equal to each other, is used. As is clear from the above, it is difficult to distinguish between gas and liquid in the two-phase state in which there is no temperature difference between a gas portion and a liquid portion.

Furthermore, as is clear from the above, even in the case where a zeotropic refrigerant is filled in the refrigerant circuit 10, if the saturated gas temperature and the saturated liquid temperature are close to each other, a false detection result may be obtained because of a small temperature difference between gas and liquid.

When the compressor 21 is stopped at the specified time A, the pressure difference between high pressure and low pressure in the liquid reserve container 24 is eliminated and pressure is equalized. The internal pressure of the liquid reserve container 24 increases as indicated by a line a, and the saturation temperature of a refrigerant also increases as indicated by a line b. At this time, if the interior of the liquid reserve container 24 is a gas phase, the temperature is indicated by a line c which varies equally to the line b, which represents the saturation temperature. Meanwhile, if the interior of the liquid reserve container 24 is a liquid phase, the temperature gradually approaches the saturation temperature (dotted line b), as indicated by a line d.

As is clear from the above, the surface temperature of the liquid reserve container 24 measured after the compressor 21 is stopped varies depending on the internal state of the liquid reserve container 24, that is, depending on whether the internal state is a gas phase or a liquid phase. Therefore, by measuring the surface temperature of the liquid reserve container 24, the liquid level position inside the liquid reserve container 24 can be identified.

(Case where Opening Degree of Expansion Valve 41 is Reduced)

Figure 6:
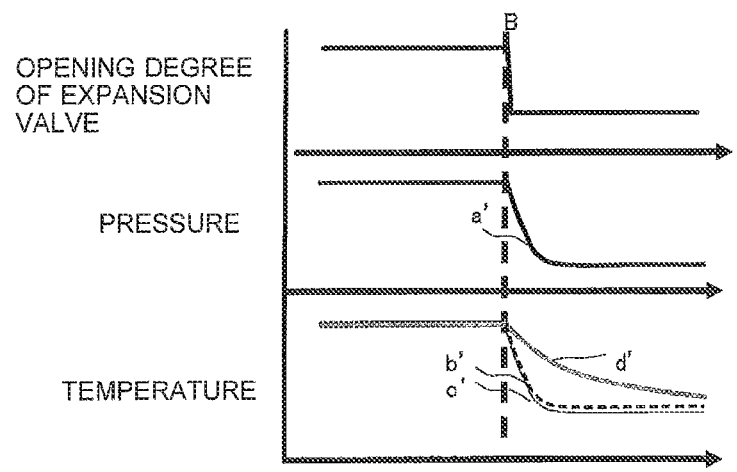
FIG. 6 illustrates time-lapse data of the opening degree of expansion valves and the low pressure, the saturation temperature, the gas-phase temperature, and the liquid-phase temperature inside the liquid reserve container in the case where the expansion valves are throttled at an specified time B.

Next, changes in the pressure and temperature inside the liquid reserve container 24 in the case where the opening degrees of the expansion valves 41A and 41B are reduced will be explained with reference to FIG. 6, which illustrates test data. FIG. 6 illustrates time-lapse data of the opening degree of the expansion valves 41A and 41B and the low-pressure side pressure, the saturation temperature, the gas-phase temperature, and the liquid-phase temperature inside the liquid reserve container in the case where the expansion valves 41A and 41B are throttled at an specified time B.

For operation of the refrigeration and air-conditioning apparatus 1, normally, except for the startup time, the element devices forming the refrigeration and air-conditioning apparatus 1 are not rapidly changed, for example, over a range of 20% relative to the set values of the element devices. Normally, the refrigeration and air-conditioning apparatus 1 satisfies demands by operating so that the balance between the capacity and load is maintained. Generally, a required load is not rapidly changed. Therefore, rapidly changing set values for the element devices of the refrigeration and air-conditioning apparatus 1, which loses heat balance, is not performed.

In contrast, the refrigeration and air-conditioning apparatus 1 provides rapid variations to the expansion valves 41A and 41b to generate a temperature difference between a gas portion and a liquid portion, which is required for identifying the liquid level position of the liquid reserve container 24. Up to the time when the expansion valves 41A and 41B are throttled, the pressure is stable at a certain value, and the interior of the liquid reserve container 24 is in a state in which a liquid phase exists in a lower portion and a gas phase exits in an upper portion, that is, a two-phase state. In the two-phase state, it is difficult to distinguish between gas and liquid, as described above.

Rapidly throttling the expansion valves 41A and 41B at the specified time B causes a refrigerant to be difficult to flow. Therefore, the amount of refrigerant on the low-pressure side decreases, the pressure on the low-pressure side decreases (line a'), and the saturation temperature also decreases (dotted line b'). At this time, if the interior of the liquid reserve container 24 is a gas phase, the temperature is indicated by a line c' which varies equally to dotted line b', which represents the saturation temperature. Meanwhile, if the interior of the liquid reserve container 24 is a liquid phase, the temperature gradually approaches the saturation temperature (dotted line b'), as indicated by a line d'.

As is clear from the above, as in the case where the compressor 21 is stopped, the surface temperature of the liquid reserve container 24 measured after the expansion valves 41A and 41B are throttled varies depending on the internal state of the liquid reserve container 24, that is, depending on whether the internal state is a gas phase or a liquid phase. Therefore, by measuring the surface temperature of the liquid reserve container 24, the liquid level position inside the liquid reserve container 24 can be identified.

The gas/liquid determination principle has been explained above by taking the example in which the compressor 21 is stopped and the example in which the expansion valves 41A and 41B are throttled. However, the present invention is not limited to this.

For example, when the frequency of the compressor 21 is increased or decreased, the opening degrees of the expansion valves 41A and 41B are increased, when the frequencies of the indoor fans 43A and 43B and the outdoor fan 27 are increased, or decreased when the opening and closing valve 28 and the opening and closing valve 29 are closed, and the like, a temperature difference occurs in the surface temperature of the liquid reserve container 24, depending on the internal state of the liquid reserve container 24. Therefore, by measuring the surface temperature of the liquid reserve container 24 at the time when these element devices are controlled, the liquid level position inside the liquid reserve container 24 may be identified. By implementing a complex combination of some controls of the element devices, the liquid level position inside the liquid reserve container 24 may be identified.

(Gas/Liquid Determination Method)

Figure 7:
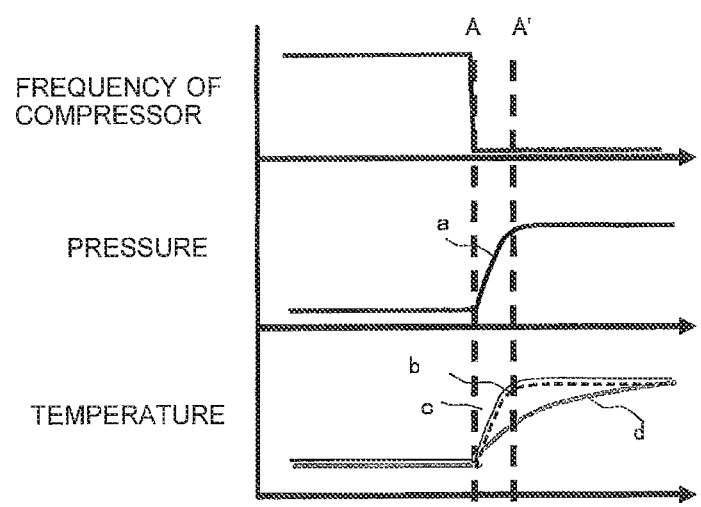
FIG. 7 illustrates time-lapse data of the frequency of a compressor and the low pressure, the saturation temperature, the gas-phase temperature, and the liquid-phase temperature inside the liquid reserve container in the case where the compressor is stopped at the specified time A and then a specified period of time has passed.
Figure 8:
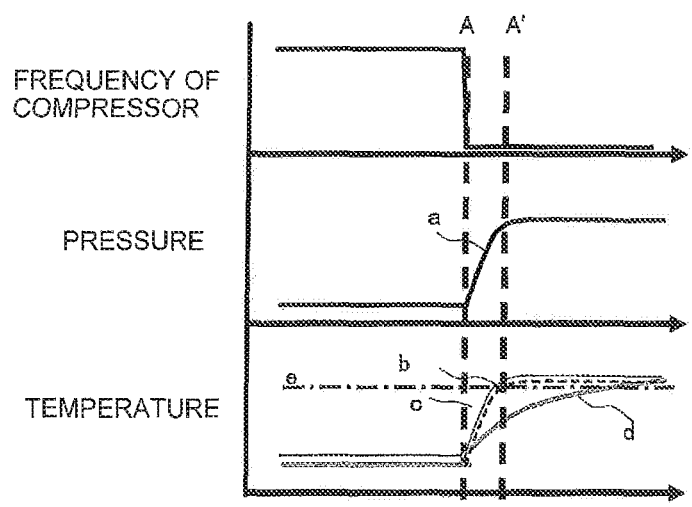
FIG. 8 illustrates the time-lapse data illustrated in FIG. 7 and data of the outside air temperature.

Next, a gas/liquid determination method will be explained with reference to FIG. 7 by way of an example in which the compressor 21 is stopped. FIG. 7 illustrates time-lapse data of the frequency of the compressor 21 and the low pressure, the saturation temperature, the gas-phase temperature, and the liquid-phase temperature inside the liquid reserve container 24 in the case where the compressor 21 is stopped at the specified time A and then a specified period of time has passed. In FIG. 8, data of outside air temperature is added to the data illustrated in FIG. 7.

As a gas/liquid determination method, a method for gas/liquid determination based on temperature data obtained when a specified period of time has passed since a change in an element device is known. In this method, when a specified period of time (for example, five minutes) has passed since stoppage of the compressor 21, which is an element device, the temperature of the liquid reserve container 24 is measured, and a gas/liquid determination is performed using the saturation temperature of a low-pressure side pressure as a threshold.

Basically, a gas portion (gas-phase portion) has the same temperature as the saturated gas temperature. However, taking into consideration heat conduction of the container, a sensor error, and the like, a gas/liquid determination is performed using the expression below, with a margin α.

|threshold−measured value|<α→gas portion

|threshold−measured value|>α→liquid portion

Here, the reason why the specified period of time is set to, for example, five minutes is that when a test is performed, about five minutes is required to acquire stable pressure after an element device is changed (that is, until time A' illustrated in FIG. 7) and a temperature difference between gas and liquid is easily determined by setting the specified period of time to about five minutes. Obviously, this period of time varies according to the device configuration and operation conditions of the refrigeration and air-conditioning apparatus 1. As described above, it is necessary to set a period of time for which a gas/liquid determination can be easily achieved for each condition, by taking the above-mentioned points into consideration.

In the above description, a gas/liquid determination is performed on the basis of a temperature difference from the saturated gas temperature. However, the present invention is not limited to this. By using a characteristic that the temperature of a gas portion is equal to the saturation temperature, when identification of the liquid level position can be achieved, that is, when temperatures measured at a plurality of measurement points are the same, the measurement positions are determined to be a gas portion. Furthermore, if temperatures at a plurality of measurement points are different from one another, the measurement positions are determined to be a liquid portion. Thus, by using the characteristic that the temperature of a gas portion is equal to the saturation temperature, a gas/liquid determination may be performed. Here, however, since the liquid reserve container 24 is made of metal with excellent heat conduction, it is required to perform a gas/liquid determination while taking into consideration electric heat at the container portion.

Furthermore, although the method for a gas/liquid determination based on temperature data obtained after a specified period of time has passed has been described above, the present invention is not limited to this. For example, a gas/liquid determination may be performed using temperature as a threshold. This is because it is considered that, for example, as illustrated in FIG. 8, when the refrigeration and air-conditioning apparatus 1 is stopped, the saturation temperature of the liquid reserve container 24 is asymptotic to the outside air temperature. Furthermore, a portion in which the saturation temperature is equal to the outside air temperature is likely to have a large temperature difference between a gas portion and liquid portion. Thus, by performing a gas/liquid determination at the time A' at which the saturation temperature is equal to the outside air temperature (line e) by using the saturation temperature as a trigger, a gas/liquid determination can be performed in the state where there is a large temperature difference between a gas portion and a liquid portion. As described above, a gas/liquid determination may be performed in a portion where there is a large difference between gas and liquid even without setting a specified period of time.

As another method, a method for adding up measured values obtained from the time when an element device is changed to an specified time and performing a gas/liquid determination on the basis of a difference in the integrated value is also possible.

(Liquid Level Identification Method)

As described above, by measuring the surface temperature of the liquid reserve container 24 by changing the pressure or the temperature inside the liquid reserve container 24, a determination as to whether the position at which a temperature sensor is installed is a gas phase or a liquid phase can be performed. Therefore, with the refrigeration and air-conditioning apparatus 1, by installing a plurality of temperature sensors in a direction vertical to the side face of the container, the liquid level position of the liquid reserve container 24 can be identified.

(Flow of Refrigerant Leakage Detection)

Next, the flow of a refrigerant leakage detection method performed by the refrigeration and air-conditioning apparatus 1 will be described. During the operation of the refrigeration and air-conditioning apparatus 1, the refrigerant leakage detection is always performed. Furthermore, the refrigeration and air-conditioning apparatus 1 is configured to be able to transmit refrigerant leakage occurrence/non-occurrence data indicating a result of detection of refrigerant leakage to a management center (not illustrated) or the like through a communication line and so that remote monitoring can be performed.

Figure 9:
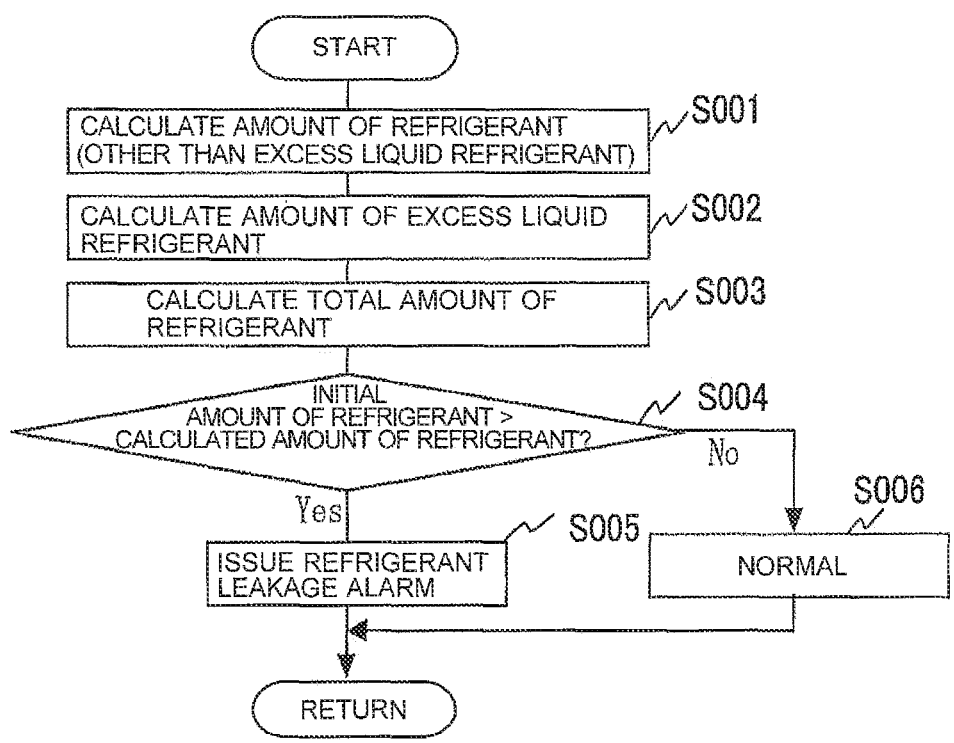
FIG. 9 is a flowchart illustrating the flow of a refrigerant leakage detection process performed by the refrigeration and air-conditioning apparatus according to Embodiment of the present invention.

The refrigeration and air-conditioning apparatus 1 detects refrigerant leakage by calculating the amount of refrigerant and monitoring a change in the calculated amount of refrigerant. A refrigerant leakage detection method performed by the refrigeration and air-conditioning apparatus 1 will be explained with reference to FIG. 9. FIG. 9 is a flowchart illustrating the flow of a refrigerant leakage detection process performed by the refrigeration and air-conditioning apparatus 1. Refrigerant leakage detection is not a particular operation to be performed for refrigerant leakage detection but performed during a normal cooling operation or heating operation of the refrigeration and air-conditioning apparatus 1. That is, the controller 3 performs refrigerant leakage detection by concurrently performing the process represented by the flowchart of FIG. 9 while performing a normal operation.

First, the controller 3 calculates the amount of refrigerant in the refrigerant circuit 10 other than excess liquid refrigerant (step S001). The flow of calculation of the amount of refrigerant other than excess liquid refrigerant will be explained later with reference to FIG. 10.

Next, the controller 3 calculates the amount of excess liquid refrigerant (step S002). The flow of calculation of the amount of excess liquid refrigerant will be explained later with reference to FIG. 11.

Next, the controller 3 calculates the total amount of refrigerant (step S003). More specifically, the controller 3 calculates the total amount of refrigerant by adding the amount of refrigerant other than excess liquid refrigerant calculated in step S001 to the amount of excess liquid refrigerant calculated in step S002.

Next, the controller 3 compares the total amount of refrigerant calculated in step S003 with the initial amount of refrigerant filled up at the time when the refrigeration and air-conditioning apparatus 1 was installed (step S004). At this time, when the calculated amount of refrigerant is smaller than the initial amount of refrigerant, the process proceeds to step S005. Meanwhile, when the calculated amount of refrigerant is larger than the initial amount of refrigerant, the process proceeds to step S006.

Next, in step S005, since it is determined in step S004 that the total amount of refrigerant is smaller than the initial amount of refrigerant, the controller 3 determines that refrigerant leakage has occurred, and issues a refrigerant leakage alarm.

Meanwhile, in step S006, since it is determined in step S004 that the total amount of refrigerant is equal to the initial amount of refrigerant, the controller 3 determines that refrigerant leakage has not occurred, and sends a report indicating normality.

(Flow of Calculation of Amount of Refrigerant Other than Excess Liquid Refrigerant)

Next, the flow of calculation of the amount of refrigerant other than excess liquid refrigerant in step S001 of FIG. 9 will be explained with reference to FIG. 10. FIG. 10 is a flowchart illustrating the flow of calculation of the amount of refrigerant other than excess liquid refrigerant in step S001 of FIG. 9 which illustrates the refrigerant leakage detection process performed by the refrigeration and air-conditioning apparatus 1.

First, in device information acquisition in step S101, the controller 3 acquires from the storage unit 3e the internal volume of each component element in the refrigerant circuit 10 necessary for calculation of the amount of refrigerant.

More specifically, the controller 3 acquires the internal volumes of the individual pipes and individual devices (the indoor heat exchangers 42A and 43B) in the indoor units 4A and 4B, the internal volumes of the individual pipes and individual devices (the compressor 21 and the outdoor heat exchanger 23) in the outdoor unit 2, and the internal volumes of the liquid-side extension pipe 6 and the gas-side extension pipe 7. The above internal volume data is stored in advance in the storage unit 3e of the controller 3. The above internal volume data may be input to the storage unit 3e by an installation contractor through the input unit 3g. Alternatively, when the outdoor unit 2 and the indoor units 4A and 4B are installed and communication settings are done, the controller 3 may automatically communicate with an external management center or the like to acquire the internal volume data.

Next, the controller 3 collects the current operation data (step S102). The operation data to be collected is data indicating the operation state quantity of the refrigeration and air-conditioning apparatus 1. More specifically, the operation data includes the frequencies of the compressor 21 and fans (the indoor fans 43A and 43B and the outdoor fan 27), which are actuators, as well as measured values obtained from the pressure sensors (34a and 34b) and the temperature sensors (33a to 33l). Therefore, since the amount of refrigerant other than the amount of excess liquid refrigerant in the liquid reserve container 24 is calculated by only using necessary data to be used for device operations, the calculation of the amount of refrigerant does not increase the communication load.

Next, the controller 3 determines, on the basis of the data collected in step S102, whether or not the refrigeration cycle is stable (step S103). For example, in the case where the rotation speed of the compressor 21 varies or the opening degrees of the expansion valves 41A and 41B vary at a startup time or the like, the operation of the refrigerant circuit is not stable, and therefore the amount of refrigerant cannot be calculated accurately. Accordingly, the refrigeration and air-conditioning apparatus 1 determines whether or not the refrigeration cycle is stable and then starts a process for calculating the amount of refrigerant.

Here, a determination as to whether the refrigeration cycle is stable or unstable is made on the basis of operation data of the actuators, as well as the pressure data and the temperature data acquired in step S102. In the explanation provided below, the various data acquired in step S102 will be simply referred to as operation data. The determination as to whether the refrigeration cycle is stable or unstable may be performed by acquiring operation data for a specified period of time, for example, 10 minutes, calculating the average of the acquired operation data, calculating a deviation between the average and operation data, and determining that operation data for which the deviation is within a range of 15 percent of the average or below indicates a stable state and that operation data for which the deviation is beyond the range indicates an unstable state.

When it is determined in step S103 that the refrigeration cycle is unstable, since the amount of refrigerant cannot be calculated accurately, the controller 3 returns to step S102 to collect data.

Meanwhile, when it is determined in step S103 that the refrigeration cycle is stable, the controller 3 calculates the amount of refrigerant in the refrigerant circuit 10 other than the amount of excess liquid refrigerant in the liquid reserve container 24 by the refrigerant amount calculation unit 3b (step S104 and step S105).

More specifically, the controller 3 first calculates the density of refrigerant in the individual elements by using stable data (operation data) acquired in step S103 (step S104). That is, basically, the density of a single-phase portion in which a refrigerant is either liquid or gas can be calculated from pressure and temperature. For example, in a portion from the compressor 21 to the outdoor heat exchanger 23, a refrigerant is in a gas state, and the density of the gas refrigerant in this portion can be calculated from the discharge pressure detected by the discharge pressure sensor 34b and the discharge temperature detected by the discharge temperature sensor 33b.

Furthermore, regarding the density of a two-phase portion such as a heat exchanger or the like in which a state changes in the two-phase state, the two-phase density average is calculated on the basis of the device outlet/inlet state quantity by using an approximation. The approximation and the like necessary for the above calculations are stored in advance in the storage unit 3e. The refrigerant amount calculation unit 3b calculates the refrigerant densities of the component element parts of the refrigerant circuit 10 other than the liquid reserve container 24 by using the operation data acquired in step S103 and data of the approximation and the like stored in advance in the storage unit 3e.

Next, the refrigerant amount calculation unit 3b calculates the amount of refrigerant in the refrigeration and air-conditioning apparatus 1 other than excess liquid refrigerant by adding up the internal volume data of the individual elements acquired in step S101 and the refrigerant densities of the individual elements calculated in step S104 (step S105).

(Flow of Calculation of Amount of Excess Liquid Refrigerant)

Next, the flow of calculation of the amount of excess liquid refrigerant in step S002 of FIG. 9 will be explained with reference to FIG. 11 by way of an example in which the compressor 21 is stopped. FIG. 11 is a flowchart illustrating the flow of calculation of the amount of excess liquid refrigerant in step S002 of FIG. 9 which illustrates the refrigerant leakage detection process performed by the refrigeration and air-conditioning apparatus 1.

First, in step S201, the controller 3 stops the compressor 21. This is necessary for generating a difference in the surface temperature between a gas portion and a liquid portion in the liquid reserve container 24 to identify the amount of liquid in the liquid reserve container 24.

Next, in step S202, the controller 3 determines whether a specified period of time has passed. When the specified period of time has passed, the process proceeds to step S203 to measure pressure. In Embodiment, the liquid reserve container 24 is installed on the low-pressure side. Therefore, low-pressure side pressure is measured.

In step S204, the controller 3 calculates the saturation temperature from the pressure measured in step S203 and stores the calculated saturation temperature in the storage unit 3e as a threshold. After that, the controller 3 measures the surface temperature of the liquid reserve container 24 on the basis of information acquired from the temperature sensors 36a to 36c installed on the surface of the liquid reserve container 24 (steps S205 to S208).

First, in step S205, the controller 3 sets n to 1.

In step S206, the controller 3 measures, based on information from the nth temperature sensor (for example, the temperature sensor 36a), the surface temperature of the liquid reserve container 24 at the position where the nth temperature sensor is installed, and stores the measured surface temperature.

The controller 3 determines whether n is equal to the number of sensors in step S207.

When n is not equal to the number of sensors, n is incremented by one in step S208, and the processing of step S206 is performed again.

After measuring the surface temperature of the liquid reserve container 24 on the basis of information acquired from all the temperature sensors and storing the measured surface temperatures (step S207; Yes), the controller 3 sets n to 1 again in step S209.

In steps S210 to S218, the flow for identifying the liquid level position is illustrated. In step S210, the controller 3 calculates the difference from the saturation temperature as the threshold, and determines whether the absolute value of the difference falls within $\alpha$. That is, in step S210, the controller 3 performs a gas/liquid determination.

When the difference is larger than $\alpha$, it is determined that the position is a liquid portion where there is a large temperature difference from the saturation temperature. Therefore, the controller 3 proceeds to step S211 to set the sensor number of the sensor that has passed step S210 as m (S211), and moves onto the next sensor. When a sensor is positioned in a liquid portion of the liquid reserve container 24, the controller 3 repeats steps S210 to S213, and stores the sensor number of the sensor at the highest position in the liquid portion as m (step S218).

When the difference is within $\alpha$, since the temperature is substantially equal to the saturation temperature, the position is determined to be a gas portion. The controller 3 proceeds to step S214. Once it is determined in S210 that the position is a gas portion, unless a sensor failure occurs, it is impossible to determine that the position is a liquid portion later, in terms of the gas/liquid determination principle in Embodiment. Therefore, the controller 3 increments n by one in step S215, and then moves onto a determination in step S216. When the position is determined to be a liquid portion (the value is larger than $\alpha$) in step S216, the controller 3 proceeds to step S217, and issues an alarm indicating that it is impossible to detect the liquid level and to calculate the amount of excess liquid refrigerant.

Meanwhile, when the position is determined to be a gas portion (the value falls within $\alpha$) in step S216, the controller 3 repeats steps S214 to S216 until a temperature sensor for which a determination result indicating a gas portion is maintained among temperature sensors determined to be a gas portion is reached.

As described above, in accordance with the flow from steps S210 to S218, the controller 3 is able to clarify the sensor number m of the sensor at the highest position in the liquid portion.

Next, in step S219, the controller 3 calculates the volume of excess liquid refrigerant in the liquid reserve container 24 on the basis of the sensor number of the sensor determined to be present at the highest position in the liquid portion. The volume of excess liquid refrigerant is calculated based on the relationship between the sensor number stored in advance in the storage unit 3e and the volume of excess liquid refrigerant.

Next, in step S220, the controller 3 calculates the saturated gas density and the saturated liquid density on the basis of the pressure inside the liquid reserve container 24.

Next, in step S221, the controller 3 calculates the amount of excess liquid refrigerant on the basis of the volume of excess liquid refrigerant calculated in step S219 and the saturated gas density and the saturated liquid density of the liquid reserve container 24 calculated in step S220.

Since the amount of excess liquid refrigerant can be calculated as described above, the controller 3 restarts the compressor 21 again in step S222.

An explanation is provided above on the assumption that the relationship between the position of a temperature sensor installed on the surface of the liquid reserve container 24 and the amount of liquid is already known. However, the present invention is not limited to this. For example, in the case where a temperature sensor is installed at an existing refrigeration and air-conditioning apparatus, or the like, the relationship between the position of a temperature sensor and the amount of liquid is unclear. In such a case, after temperature sensors are installed, by adding initial learning processing for identifying the relationship between the number of a temperature sensor at the highest position in a liquid portion and the liquid volume on the basis of multiple conditions in which a plurality of amounts of excess liquid refrigerant change and storing the identified relationship as a database, the amount of excess liquid refrigerant can be obtained.

As described above, by causing the controller 3 to change the internal pressure and temperature of the liquid reserve container 24 to generate a state in which there is a difference in the temperature between a gas-phase portion and a liquid-phase portion on the surface of the liquid reserve container 24 and measuring the temperatures, the refrigeration and air-conditioning apparatus 1 is able to identify the liquid level position. Thus, with the refrigeration and air-conditioning apparatus 1, a simple configuration including only temperature sensors as liquid level sensors can be implemented, and advantageous effects, such as a low cost, a reduction in measured value variations, and easy sensor installation, can be achieved.

Furthermore, with the refrigeration and air-conditioning apparatus 1, the amount of refrigerant leakage can also be calculated. Therefore, before maintenance, information of the degree of refrigerant leakage, processing of an maintenance operation, and the like can be obtained in advance, and thus improving the maintenance operation efficiency.

Embodiment of the present invention has been described above with reference to the drawings. However, the specific configuration is not limited to Embodiment described above. Changes may be made without departing from the gist of the present invention.

For example, a multi-air-conditioning apparatus for a building has been explained as illustrated in FIG. 1 in Embodiment, the present invention is not limited to this. For example, a refrigeration and air-conditioning apparatus, such as a refrigeration machine, in which the four-way valve 22 is not provided and a liquid reserve container is installed at the outlet of an outdoor heat exchanger in a high pressure portion is also applicable. That is, it is possible to detect excess liquid refrigerant inside the liquid reserve container on a high-pressure side and to detect refrigerant leakage.

Furthermore, although a configuration in which the expansion valves 41A and 41B are installed in the indoor units 4A and 4B has been described above, the present invention is not limited to this. A configuration in which the expansion valves 41A and 41B are installed in the outdoor unit 2 is also possible. In any case, the present invention is applicable.

Furthermore, a method for calculating the amount of refrigerant in all the element devices during an operation and detecting refrigerant leakage has been described above, the present invention is not limited to this. Occurrence or non-occurrence of refrigerant leakage may be detected by calculating the amount of refrigerant in a particular element device. For example, since the outdoor heat exchanger 23 is sufficiently larger than the indoor heat exchangers 42A and 43B, the amount of refrigerant in the indoor heat exchangers 42A and 43B in which the amount of existing refrigerant is small may not be calculated and only the amount of refrigerant in the outdoor heat exchanger 23 in which the amount of existing refrigerant is large may be calculated.

Furthermore, a method for calculating the amount of refrigerant in element devices has been described above, the present invention is not limited to this. Occurrence or non-occurrence of refrigerant leakage can be identified by setting reference operation conditions, identifying the liquid level position in the liquid reserve container 24 at that time, periodically allowing the operation state of the refrigeration and air-conditioning apparatus 1 to be equal to the reference conditions, and measuring a change in the liquid level in the liquid reserve container 24.

By establishing the above connection configuration and transmitting detection data indicating occurrence or non-occurrence of refrigerant leakage to a management center or the like, remote refrigerant leakage detection can be performed at all time. Therefore, even a sudden refrigerant leakage can be quickly coped with before an abnormality such as damage to a device, a capacity degradation, and the like occurs, and progress of the refrigerant leakage can be suppressed as much as possible. Accordingly, the reliability of the refrigeration and air-conditioning apparatus 1 is improved, and a degradation in the environmental state caused by outflow of refrigerant can be prevented as much as possible.

Furthermore, since an inconvenience in that an excessive operation continues with a small amount of refrigerant due to refrigerant leakage can be avoided, an increase in the life span of the refrigeration and air-conditioning apparatus 1 can be achieved. In the case where refrigerant leakage has occurred, the determination unit 3d may calculate the amount of refrigerant leakage and the output unit 3h may transmit information of the calculated amount of refrigerant leakage, along with a determination result, to the outside, such as a management center.

Furthermore, the case where a determination as to whether or not refrigerant leakage has occurred is performed has been explained in Embodiment described above, the present invention is also applicable to a determination as to whether or not the amount of refrigerant is excessive at the time of filling up of a refrigerant, or the like.

Furthermore, an example of a refrigeration and air-conditioning apparatus including one outdoor unit and two indoor units has been described in Embodiment described above, the present invention is not limited to this. A configuration including one outdoor unit and one indoor unit is also possible. Furthermore, a refrigeration and air-conditioning apparatus including a plurality of outdoor units and a plurality of indoor units is also possible.

REFERENCE SIGNS LIST

1: refrigeration and air-conditioning apparatus, 2: outdoor unit, 3: controller, 3a: measurement unit, 3b: refrigerant amount calculation unit, 3c: excess liquid refrigerant amount calculation unit, 3d: determination unit, 3e: storage unit, 3f: driving unit, 3g: input unit, 3h: output unit, 4: indoor unit, 4A: indoor unit, 4B: indoor unit, 6: liquid-side extension pipe, 6A: liquid main pipe, 6a: liquid branch pipe, 6b: liquid branch pipe, 7: gas-side extension pipe, 7A: gas main pipe, 7a: gas branch pipe, 7b: gas branch pipe, 10: refrigerant circuit, 10a: indoor-side refrigerant circuit, 10b: indoor-side refrigerant circuit, 10c: outdoor-side refrigerant circuit, 21: compressor, 22: four-way valve, 23: outdoor heat exchanger, 24: liquid reserve container, 27: outdoor fan, 28: opening and closing valve, 29: opening and closing valve, 31: outdoor-side control unit, 32: indoor-side control unit, 32a: indoor-side control unit, 33a: suction temperature sensor, 33b: discharge temperature sensor, 33c: outdoor temperature sensor, 33e: temperature sensor, 33f: temperature sensor, 33g: indoor temperature sensor, 33h: temperature sensor, 33i: temperature sensor, 33j: indoor temperature sensor, 33k: heat exchange temperature sensor, 33l: liquid-side temperature sensor, 34a: suction pressure sensor, 34b: discharge pressure sensor, 36a: temperature sensor, 36b: temperature sensor, 36c: temperature sensor, 41: expansion valve, 41A: expansion valve, 41B: expansion valve, 42: indoor heat exchanger, 42A: indoor heat exchanger, 42B: indoor heat exchanger, 43: indoor fan, 43A: indoor fan, 43B: indoor fan, 51a: distributor, 52a: distributor

The invention claimed is:

1. A refrigeration and air-conditioning apparatus including a refrigerant circuit formed by connecting a compressor, a condenser, an expansion valve, an evaporator, and a liquid reserve container to one another by pipes, the apparatus comprising:
   a temperature sensor that measures a surface temperature of a surface of the liquid reserve container; and
   a controller that varies a pressure or a temperature inside the liquid reserve container,
   wherein the controller
      varies the pressure or the temperature inside the liquid reserve container by stopping the compressor, controlling an opening degree of the expansion valve, or closing an opening and closing valve provided at the refrigerant circuit so that a temperature difference between a gas-phase portion inside the liquid reserve container and a liquid-phase portion inside the liquid reserve container occurs, and
      detects a liquid level position inside the liquid reserve container, based on a measured value of the temperature sensor when the temperature difference occurs.

2. The refrigeration and air-conditioning apparatus of claim 1, wherein the controller
   stops the compressor to vary the pressure or the temperature inside the liquid reserve container.

3. The refrigeration and air-conditioning apparatus of claim 1,
   wherein the refrigerant circuit includes the opening and closing valve, and
   wherein the controller
      closes the opening and closing valve to vary the pressure or the temperature inside the liquid reserve container.

4. The refrigeration and air-conditioning apparatus of claim 1, wherein the controller
   varies a frequency of the compressor by a predetermined value or more relative to a frequency set at a time other than a startup time to vary the pressure or the temperature inside the liquid reserve container.

5. The refrigeration and air-conditioning apparatus of claim 1, wherein the controller
   varies the opening degree of the expansion valve by a predetermined value or more relative to an opening degree set at a time other than a startup time to vary the pressure or the temperature inside the liquid reserve container.

6. The refrigeration and air-conditioning apparatus of claim 1, further comprising:
an outdoor fan that supplies air to an outdoor heat exchanger functioning as the condenser or the evaporator,
wherein the controller
varies a frequency of the outdoor fan by a predetermined value or more relative to a frequency set at a time other than a startup time to vary the pressure or the temperature inside the liquid reserve container.

7. The refrigeration and air-conditioning apparatus of claim 1, wherein the controller
detects refrigerant leakage by comparing, with an initial amount of refrigerant, a sum of an amount of refrigerant reserved in the liquid reserve container which is calculated based on the liquid level position and an amount of refrigerant in the refrigerant circuit other than the refrigerant reserved in the liquid reserve container.

8. The refrigeration and air-conditioning apparatus of claim 1, wherein the controller
detects the liquid level position inside the liquid reserve container, based on a comparison between the measured value of the temperature sensor and a saturation temperature of a low-pressure side pressure.

9. The refrigeration and air-conditioning apparatus of claim 1,
wherein the temperature sensor, which includes a plurality of the temperature sensors, is installed in a direction vertical to a side face of the liquid reserve container, and
wherein the controller
detects the liquid level position inside the liquid reserve container, based on a comparison among the measured values of the plurality of temperature sensors.

10. A refrigerant leakage detection device for detecting a liquid level position inside a liquid reserve container provided as one of element devices of a refrigerant circuit to detect refrigerant leakage, the device comprising:
a temperature sensor that measures a surface temperature of a surface of the liquid reserve container; and
a controller configured to vary a pressure or a temperature inside the liquid reserve container,
wherein the controller
varies the pressure or the temperature inside the liquid reserve container by stopping the compressor provided at the refrigerant circuit, controlling an opening degree of an expansion valve provided at the refrigerant circuit, or closing an opening and closing valve provided at the refrigerant circuit so that a temperature difference between a gas-phase portion inside the liquid reserve container and a liquid-phase portion inside the liquid reserve container occurs,
detects the liquid level position inside the liquid reserve container, based on a measured value of the temperature sensor when the temperature difference occurs, and
detects refrigerant leakage by comparing, with an initial amount of refrigerant, a sum of an amount of refrigerant reserved in the liquid reserve container which is calculated based on the liquid level position and an amount of refrigerant in the refrigerant circuit other than the refrigerant reserved in the liquid reserve container.

11. A refrigerant leakage detection method for detecting a liquid level position inside a liquid reserve container provided as one of element devices of a refrigerant circuit, based on a temperature of the liquid reserve container, to detect refrigerant leakage, the method comprising:
controlling at least one of the compressor and the expansion valve, which are actuators, to vary a pressure or a temperature inside the liquid reserve container;
detecting the liquid level position inside the liquid reserve container, based on the temperature of the liquid reserve container; and
determining whether a refrigerant leaks from the refrigerant circuit by comparing, with a reference amount of refrigerant, a sum of an amount of refrigerant calculated from the temperature of the liquid reserve container and an amount of refrigerant reserved in the liquid reserve container.

12. The refrigeration and air-conditioning apparatus of claim 1, wherein
the controller controls at least one of the compressor and the expansion valve, which are actuators, to vary the pressure or the temperature inside the liquid reserve container.

13. The refrigeration and air-conditioning apparatus of claim 1, wherein
the controller controls driving of the actuators so as to generate the temperature difference between the gas-phase portion and the liquid-phase portion of the refrigerant within the liquid reserve container, to vary the pressure or the temperature inside the liquid reserve container.

14. The refrigeration and air-conditioning apparatus of claim 1, wherein
an azeotropic refrigerant or a near-azeotropic refrigerant is filled in the refrigerant circuit.

15. A refrigeration and air-conditioning apparatus comprising:
a refrigerant circuit formed by connecting a compressor, a condenser, an expansion valve, an evaporator, and a liquid reserve container to one another by pipes;
a liquid level detection sensor that detects an amount of liquid refrigerant within the liquid reserve container; and
a refrigerant leakage detection device that determines whether there occurred refrigerant leakage from the refrigerant circuit by detecting an amount of liquid refrigerant within the liquid reserve container at a predetermined time after stop of the compressor by the liquid level detection sensor, and comparing a value obtained by the detection with a predetermined reference value.

16. The refrigeration and air-conditioning apparatus of claim 15, varying an opening degree of the expansion valve after the stop of the compressor from an opening degree upon the stop of the compressor.

17. The refrigeration and air-conditioning apparatus of claim 15, wherein the predetermined time is set to five minutes.

18. The refrigeration and air-conditioning apparatus of claim 15, varying an internal pressure of the liquid reserve container after the stop of the compressor.

19. The refrigeration and air-conditioning apparatus of claim 15, wherein
the liquid level detection sensor is constituted of a temperature sensor, and detects an amount of liquid refrigerant by measuring a surface temperature of the liquid reserve container.

20. A refrigerant leakage detection device configured to detect refrigerant leakage from a refrigerant circuit formed by connecting a compressor, a condenser, an expansion valve, an evaporator, and a liquid reserve container to one another by pipes, the refrigerant leakage detection device detecting an amount of liquid refrigerant within the liquid reserve container, and comprising a determining section configured to determine whether there occurred refrigerant leakage from the refrigerant circuit based on an amount of excessive liquid refrigerant at a predetermined time after stop of the compressor.

21. The refrigerant leakage detection device of claim 20, further comprising an output unit configured to output the result of determination by the determining section.

22. A method for detecting refrigerant leakage from a refrigerant circuit formed by connecting a compressor, a condenser, an expansion valve, an evaporator, and a liquid reserve container to one another by pipes, the method comprising:
- detecting an amount of liquid refrigerant within the liquid reserve container,
- comparing the amount of excessive liquid refrigerant at a predetermined time after stop of the compressor with a predetermined reference value, and
- determining that there occurred refrigerant leakage from the refrigerant circuit when the excessive amount of liquid refrigerant is smaller than the reference value.

\* \* \* \* \*